United States Patent
Ryu et al.

(10) Patent No.: US 9,965,113 B2
(45) Date of Patent: May 8, 2018

(54) TOUCH WINDOW

(71) Applicant: LG INNOTEK CO., LTD., Seoul (KR)

(72) Inventors: Ji Chang Ryu, Seoul (KR); Gyu Rin Lee, Seoul (KR); Soung Kyu Park, Seoul (KR); Mun Suk Kang, Seoul (KR); Do Youb Kwon, Seoul (KR); Seok Pyo Yun, Seoul (KR); Jin Seok Lee, Seoul (KR); Chung Wan Lee, Seoul (KR); Gwang Hei Choi, Seoul (KR); Jae Hak Her, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 157 days.

(21) Appl. No.: 14/685,870

(22) Filed: Apr. 14, 2015

(65) Prior Publication Data
US 2015/0293629 A1    Oct. 15, 2015

(30) Foreign Application Priority Data

Apr. 14, 2014   (KR) .................. 10-2014-0044217
May 30, 2014   (KR) .................. 10-2014-0066009
Jul. 7, 2014   (KR) .................. 10-2014-0084777

(51) Int. Cl.
    *G06F 3/044*             (2006.01)

(52) U.S. Cl.
    CPC .... *G06F 3/044* (2013.01); *G06F 2203/04102* (2013.01); *G06F 2203/04103* (2013.01); *G06F 2203/04112* (2013.01)

(58) Field of Classification Search
    CPC .......... G06F 3/044; G06F 2203/04102; G06F 2203/04103; G06F 2203/04112
    See application file for complete search history.

(56) References Cited

U.S. PATENT DOCUMENTS

| | | | |
|---|---|---|---|
| 2007/0074316 A1 | 3/2007 | Alden et al. | |
| 2012/0194259 A1* | 8/2012 | Hsu .................. | G06F 3/044 327/517 |
| 2012/0242585 A1* | 9/2012 | Jones ................ | G06F 3/044 345/173 |
| 2012/0249465 A1* | 10/2012 | Lin .................. | G06F 3/041 345/173 |
| 2012/0262385 A1* | 10/2012 | Kim ................. | G06F 3/044 345/173 |
| 2013/0271675 A1* | 10/2013 | Misaki ............. | G06F 3/044 349/12 |
| 2013/0301272 A1* | 11/2013 | Wang ............... | G06F 1/1656 362/293 |

(Continued)

FOREIGN PATENT DOCUMENTS

| KR | 10-2008-0066658 A | 7/2008 |
|---|---|---|
| KR | 10-2012-0034505 A | 4/2012 |

(Continued)

*Primary Examiner* — Lisa Landis
(74) *Attorney, Agent, or Firm* — KED & Associates, LLP

(57) ABSTRACT

Disclosed is a touch window. The touch window includes a cover substrate; a substrate on the cover substrate; and an electrode on the substrate, wherein the substrate includes one surface facing the cover substrate and an opposite surface opposite to the one surface, the electrode is disposed on the opposite surface, and the cover substrate and the substrate have flexible curved surfaces.

19 Claims, 33 Drawing Sheets

(56) References Cited

U.S. PATENT DOCUMENTS

| | | | |
|---|---|---|---|
| 2014/0028584 A1 | 1/2014 | Park et al. | |
| 2014/0100301 A1* | 4/2014 | Lin | C08L 83/04 522/8 |
| 2014/0174523 A1* | 6/2014 | Ko | C09D 183/04 136/256 |
| 2014/0184937 A1* | 7/2014 | Lim | H01L 27/323 349/12 |

FOREIGN PATENT DOCUMENTS

| | | |
|---|---|---|
| KR | 10-2013-0003215 A | 1/2013 |
| KR | 10-2013-0098774 A | 9/2013 |
| KR | 10-2014-0016070 A | 2/2014 |
| KR | 10-1372525 B1 | 3/2014 |

* cited by examiner

TOUCH WINDOW

CROSS-REFERENCE TO RELATED APPLICATIONS

This application claims priority under 35 U.S.C. § 119 to Korean Application Nos. 10-2014-0044217 filed Apr. 14, 2014, 10-2014-0066009 filed on May 30, 2014, and 10-2014-0084777 filed on Jul. 7, 2014, whose entire disclosures are incorporated herein by reference.

BACKGROUND

1. Field

The embodiment relates to a touch window.

2. Background

Recently, a touch panel, which performs an input function through the touch of an image displayed on a display device by an input device such as a stylus pen or a hand, has been applied to various electronic appliances.

The touch panel may be representatively classified into a resistive touch panel and a capacitive touch panel. In the resistive touch panel, the position of the touch point is detected by detecting the variation of resistance according to the connection between electrodes when pressure is applied to the input device. In the capacitive touch panel, the position of the touch point is detected by detecting the variation of capacitance between electrodes when a finger of the user touches the capacitive touch panel. When taking into consideration the convenience of a fabrication scheme and a sensing power, the capacitive touch panel has been spotlighted in a smaller model touch panel recently.

According to the touch window, a sensing electrode and a wire electrode connected to the sensing electrode are disposed on a substrate, and when an area on which the sensing electrode is disposed is touched, the variation of capacitance is sensed so that the position of the touch point can be detected.

In this case, the sensing electrode and the wire electrode may be disposed on one surface of a single substrate or one surfaces of a plurality of substrates, respectively.

Meanwhile, in recent years, a touch window having a curved surface or a bendable structure is increasingly requested. As the touch window, that is, the substrate is bent, a stress may be generated to an electrode disposed on the substrate, so that crack occurs in the electrode due to the stress, thereby damaging the electrode.

Therefore, a touch window having a new structure capable of solving the above problem is required.

BRIEF DESCRIPTION OF THE DRAWINGS

The embodiments will be described in detail with reference to the following drawings in which like reference numerals refer to like elements wherein.

DETAILED DESCRIPTION

Figure 1:
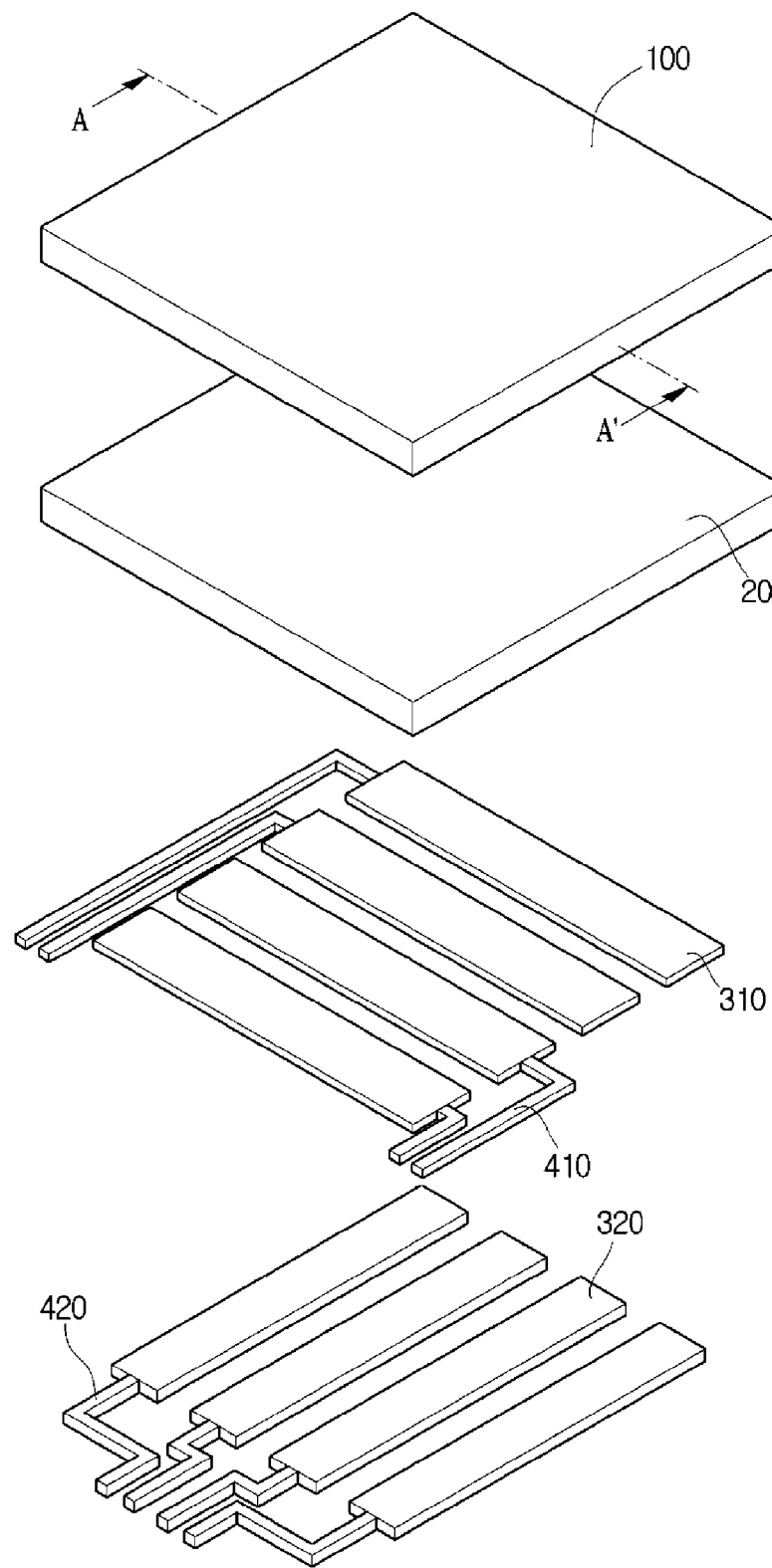
FIG. 1 is an exploded perspective view showing a touch window according to the first embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer (or film), each region, each pattern, or each structure shown in the drawings may be modified for the purpose of convenience or clarity of the explanation. In addition, the size of elements does not utterly reflect an actual size.

Hereinafter, the embodiment will be described with reference to accompanying drawings.

Referring to FIGS. 1 to 6, a touch window according to the first embodiment may include a cover substrate 100 and/or a substrate 200, a sensing electrode and a wire electrode.

The cover substrate 100 may be flexible or rigid. For example, the cover substrate 100 may include glass or plastic. In detail, the cover substrate 100 may include chemically tempered glass such as soda lime glass or aluminosilicate glass, or plastic such as polyethylene terephthalate (PET).

Figure 2:
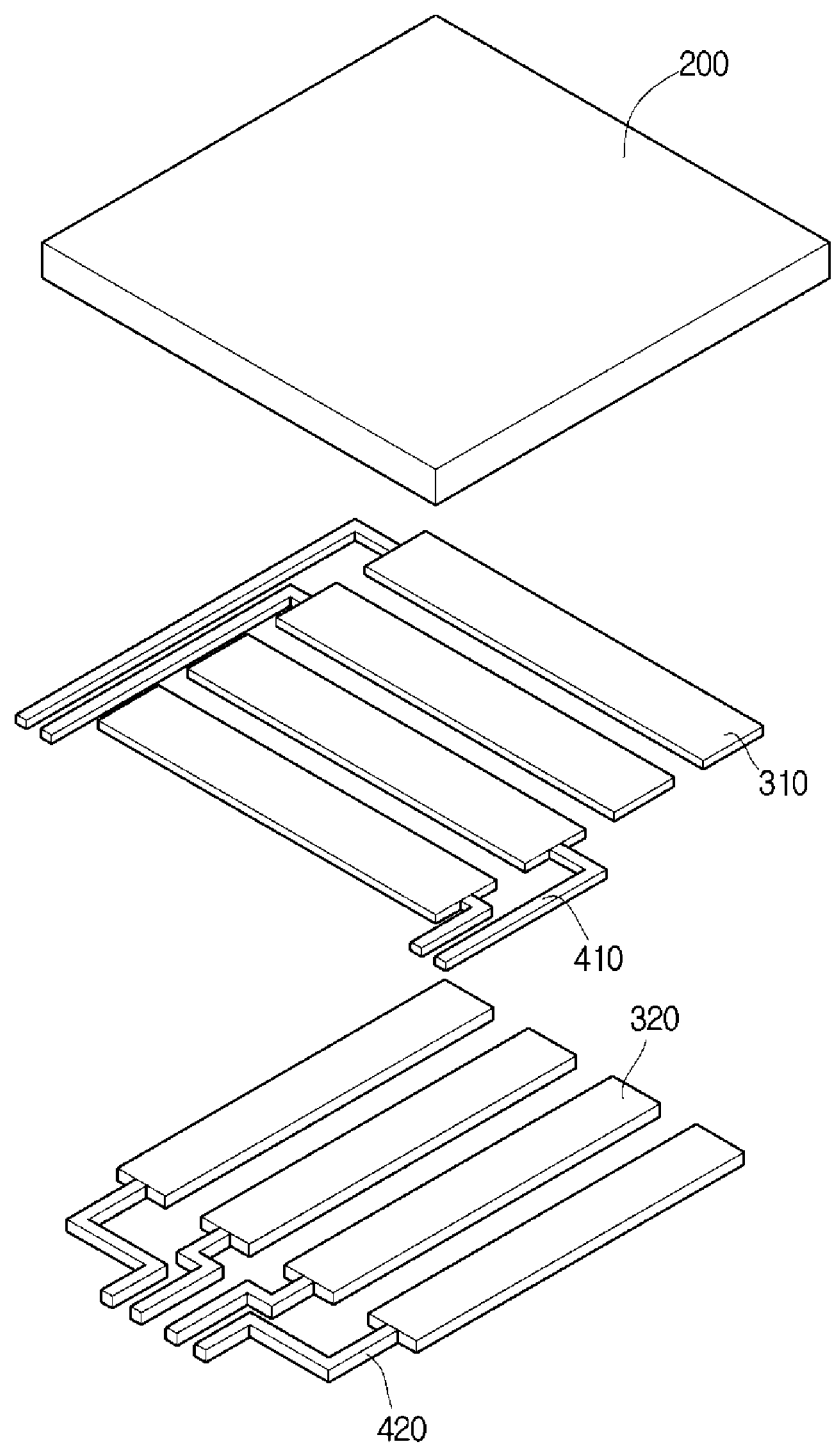
FIG. 2 is another exploded perspective view showing the touch window according to the first embodiment.

In addition, referring to FIG. 2, the cover substrate may not be disposed on the substrate 200. The substrate itself may perform a function of the cover substrate and may support electrodes.

Hereinafter, the touch window according to the first embodiment will be described focused on FIG. 1 in which the cover substrate disposed is depicted.

Referring to FIG. 1, the substrate 200 may be disposed on the cover substrate 100. For example, the substrate 200 may be disposed under the cover substrate 100.

In addition, the substrate 200 may adhere to the cover substrate 100. For example, the cover substrate 100 and the substrate 200 may adhere to each other through a transparent adhesive material such as an optical clear adhesive (OCA) layer.

The substrate 200 may be flexible. For example, the substrate 200 may include plastic. In detail, the substrate 200 may include plastic such as polyethylene terephthalate (PET). In detail, as shown in FIG. 2, when the substrate 200 simultaneously performs a function of the cover substrate, the substrate 200 may include a flexible and rigid material. An active area AA and an unactive area UA may be defined in the cover substrate 100 and/or the substrate 200.

An image may be displayed in the active area AA and the image may not be displayed in the unactive area UA provided around the active area AA.

In addition, the position of an input device (e.g., finger) may be sensed in at least one of the active area AA and the unactive area UA. If the input device, such as a finger, touches the touch window, the variation of capacitance occurs in the touched part by the input device, and the touched part subject to the variation of the capacitance may be detected as a touch point. The substrate 200 may include two surfaces concerned with the cover window. In detail, the substrate 200 may include one surface 200a facing the cover substrate 100 and the other surface 200b opposite to the one surface 200a.

First and second sensing electrodes 310 and 320 and first and second wire electrodes 410 and 420 may be disposed on the substrate 200. In detail, the first and second sensing electrodes 310 and 320 and the first and second electrodes 410 and 420 may be disposed on the other surface 200b of the substrate 200. That is, in the touch window according to the embodiment, the cover substrate 100, the substrate 200 and an electrode may be sequentially disposed.

The first and second sensing electrodes 310 and 320 may be disposed on the active area AA of the substrate 200. The first and second sensing electrodes 310 and 320 may extend in mutually different directions and may be disposed on the active area AA of the substrate 200. An insulating layer may be interposed between the first and second sensing electrode 310 and 320 to insulate the first and second sensing electrodes 310 and 320 from each other. For example, the insulating layer 330 may cover the entire surface of the first sensing electrode 310, such that the first and second sensing electrode 310 and 320 may be insulated from each other.

The insulating layer 330 may include a material different from the cover substrate 100 and/or the substrate 200. For example, the insulating layer 330 may include a dielectric material.

For example, the insulating layer 330 may include an insulating group including halogen compound of alkali metal or alkali earth metal, such as LiF, KCl, $CaF_2$, or $MgF_2$, or fused silica, such as $SiO_2$, $SiN_x$, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as $ZnO_x$, ZnS, ZnSe, $TiO_x$, $WO_x$, $MoO_x$, or $ReO_x$; an organic semiconductor group including Alq3, NPB, TAPC, 2TNATA, CBP or Bphen; and a low-K material such as silsesquioxane or a derivative ((H—$SiO_{3/2})_n$) thereof, methylsilsesquioxane ($CH_3$—$SiO_{3/2})_n$), porous silica or porous silica doped with fluorine or carbon atoms, porous zinc oxide (ZnOx), cyclized-perfluoropolymer (CYTOP) or a mixture thereof.

In addition, the insulating layer 330 may have visible ray transmittance of about 75% to 99%.

In this case, a thickness of the insulating layer 330 may be less than those of the cover substrate 100 and/or the substrate 200. In detail, the thickness of the insulating layer 330 may be about 0.01 to about 0.1 times those of the cover substrate 100 and/or the substrate 200. For example, thicknesses of the cover substrate 100 and/or the substrate 200 may be equal to about 0.1 mm and the thickness of the insulating layer 330 may be equal to about 0.001 mm.

The first and second sensing electrodes 310 and 320 may sense a position of an input device. Although the first and second sensing electrodes 310 and 320 are shown in a bar sharp in FIGS. 1 and 2, the embodiment is not limited thereto. The first and second sensing electrodes 310 and 320 may be formed in various shapes including a polygonal shape, such as a triangular shape or a diamond shape, a circular shape, an elliptical shape, a linear shape, or an H shape, which may sense the touch of the input device such as a finger of a user.

At least one of the first and second sensing electrodes 310 and 320 may include a transparent conductive material that allows electricity to flow therethrough without interrupting transmission of light. For example, the sensing electrode 300 may include metal oxide such as indium tin oxide (ITO), indium zinc oxide (IZO), copper oxide, tin oxide, zinc oxide, or titanium oxide.

In addition, at least one of the first and second sensing electrodes 310 and 320 may include a nano wire, a photo-sensitive nanowire film, a carbon nanotube (CNT), graphene, or conductive polymer.

In addition, at least one of the first and second sensing electrodes 310 and 320 may include various metals. For example, the sensing electrode 300 may include at least one of Cr, Ni, Cu, Al, Ag, Mo and the alloy thereof.

Figure 3:
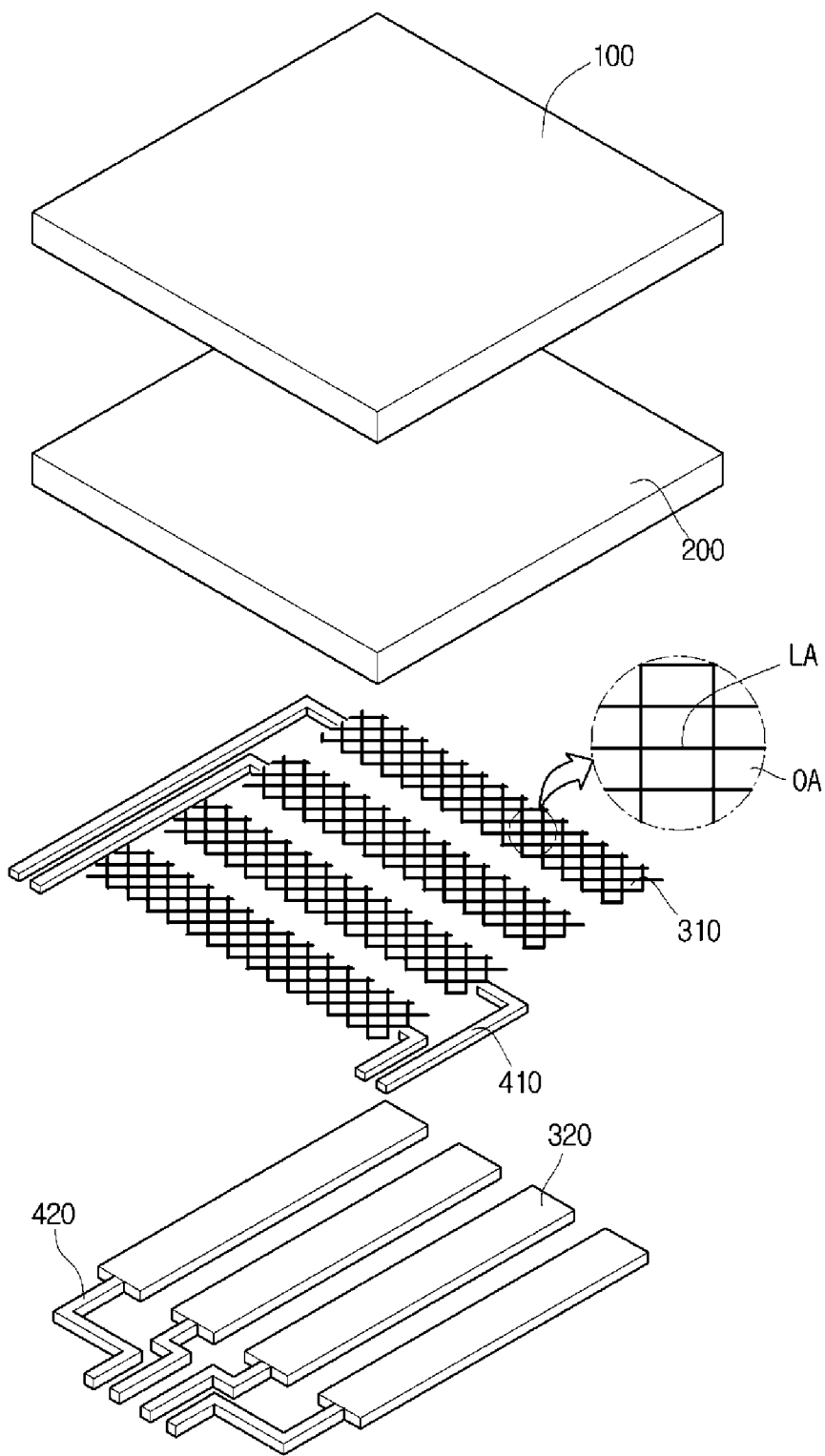
FIG. 3 is still another exploded perspective view showing the touch window according to the first embodiment.
Figure 4:
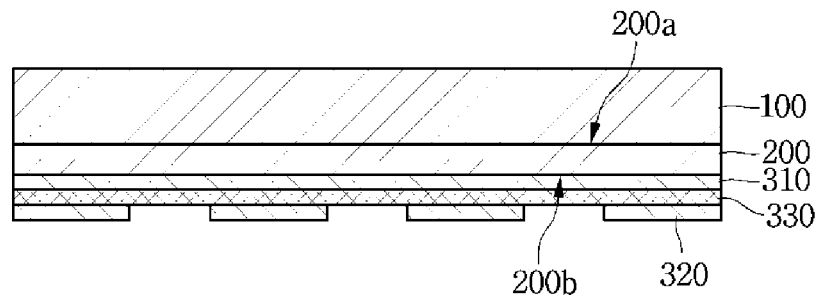
FIG. 4 is a sectional view taken along line A-A' of FIG. 1.

Referring to FIG. 3, at least one of the first and second sensing electrodes 310 and 320 may be disposed in a mesh shape.

In detail, at least one of the first and second sensing electrodes 310 and 320 may include a plurality of sub-electrodes which cross each other in a mesh shape.

In detail, referring to FIG. 3, at least one of the first and second sensing electrodes 310 and 320 may includes mesh lines LA by the sub-electrode crossing each other in a mesh shape and a mesh opening part OA between the mesh lines LA. In this case, a line width of the mesh line LA may be in the range of about 0.1 μm to about 10 μm If the line width of the mesh line LA is less than about 0.1 t ss thmesh line LA may not be fabricated. If the line width of the mesh line LA exceeds about 10 μm, a sensing electrode pattern may be visually recognized from an outside, so that the visibility may be degraded. In addition, the line width of the mesh line LA may be in the range of about 1 μm to about 5 μm Preferably, the line width of the mesh line LA may be in the range of about 1.5 μm to about 3 μm The mesh opening part OA may have a rectangular shape, but the embodiment is not limited thereto. The mesh opening part OA may have various shapes such as a polygonal shape including a diamond shape, a pentagon shape, or a hexagonal shape, or a circular shape. In addition, the mesh opening part OA may have a regular shape or a random shape.

The sensing electrode may have a mesh shape, so that the sensing electrode pattern may not be viewed on the active area AA. That is, even though the sensing electrode is formed of metal, the pattern may not be viewed. In addition, even if the sensing electrode is applied to a large-size touch window, the resistance of the touch window may be lowered.

The first and second wire electrodes 410 and 420 may be disposed on the unactive area UA of the substrate 200. In detail, one ends of the first and second wire electrodes 410 and 420 may be connected to the first and second sensing electrodes 310 and 320, and the other ends may be connected to a printed circuit bard. Various types of printed circuit boards may serve as the printed circuit board. For example, a flexible printed circuit board (FPCB) may be applied as the printed circuit board.

The first and second wire electrodes 410 and 420 may include a metal having excellent conductance. For example, the first and second wire electrodes 410 and 420 may include at least one of Cr, Ni, Cu, Al, Ag, Mo and the alloy thereof.

Figure 5:
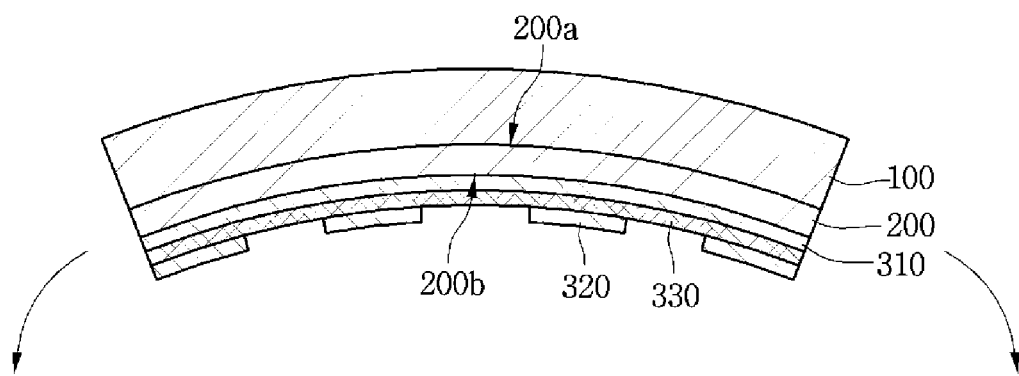
FIG. 5 is another sectional view taken along line A-A' of FIG. 1.
Figure 6:
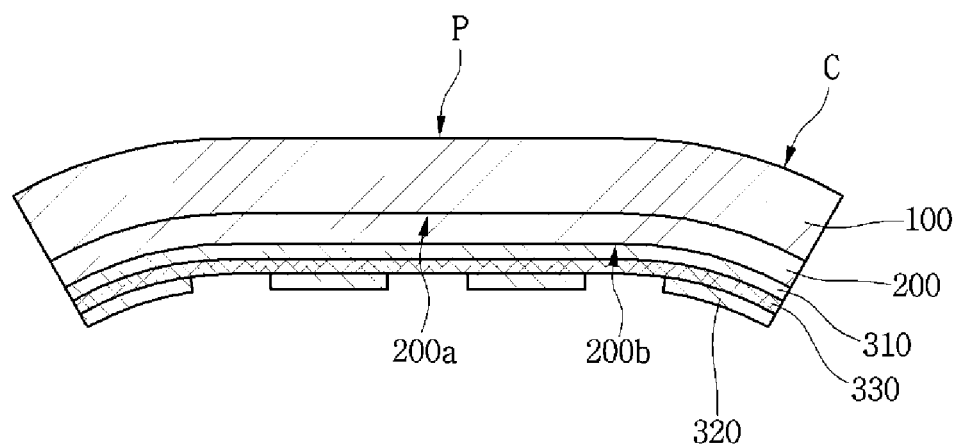
FIG. 6 is still another sectional view taken along line A-A' of FIG. 1.

Referring to FIGS. 5 and 6, the substrate 200 may be a curved substrate or a flexible substrate. For example, the substrate 200 may be bent or have a curved surface in an opposite surface direction.

In detail, the substrate 200 may have an entirely or partially curved surface.

Referring to FIG. 5, the substrate 200 may be flexible while entirely having a curved surface.

In addition, referring to FIG. 6, the substrate 200 may be bent while having a partial curved surface. That is, referring to FIG. 6, the substrate 200 may be bent while having a partial flat surface P and a partial curved surface C. In detail, an end of the substrate 200 may be bent while having a curved surface.

Since the substrate 200 includes both the flat surface P and the curved surface C, a touch operation and the display area may be utilized through the flat surface similarly to the related art. At the same time, the display area having the curved surface may be utilized, so that various touches and convenience may be provided to a user.

Since the first and second sensing electrodes 310 and 320 are disposed on the other surface 200b of the substrate 200, the first and the second electrodes 310 and 320 may be disposed on an inner surface of the bendable substrate 200. That is, the first and second sensing electrodes 310 and 320 may be disposed on a compressed surface of the substrate 200.

That is, the other surface 200b of the substrate 200 on which the first and second sensing electrodes 310 and 320 are disposed may be the same as the inner surface of the bendable substrate 200 and the compressed surface of the substrate 200.

When the substrate 200 has a curved surface or is bent, various stresses such as compressive force, tension and shearing force may be applied to the first and second sensing electrodes 310 and 320, so that the first and second sensing electrodes 310 and 320 may be modified or damaged due to the stresses.

In this case, the stress applied to the first and second sensing electrodes 310 and 320 may be reduced when the first and second sensing electrodes 310 and 320 are disposed on the inner surface of the bendable substrate and the compressed surface of the substrate 200, as compared with when the first and second sensing electrodes 310 and 320 are disposed on an outer bent surface, that is, expanded surface of the bendable substrate 200.

Thus, when the substrate 200 has a curved surface or is bent, the first and second sensing electrodes 310 and 320 disposed on the substrate 200 may be prevented from being damaged due to stresses, so that the bending property and reliability of the flexible touch window may be improved.

Hereinafter, a touch window according to the second embodiment will be described with reference to FIGS. 7 to 12. In the following description of the touch window according to the second embodiment, the detailed descriptions about the parts similar or identical to those described in the touch windows of the first embodiment will be omitted in order to avoid redundancy.

Referring to FIGS. 7 to 12, a touch window according to the second embodiment may include a cover substrate 100, and first and second substrates 210 and 220.

The first substrate 210 may be disposed on the cover substrate 100 and the second substrate 220 may be disposed on the first substrate 210. In detail, the first substrate may be disposed below the cover substrate 100 and the second substrate 220 may be disposed below the first substrate 210.

Figure 8:
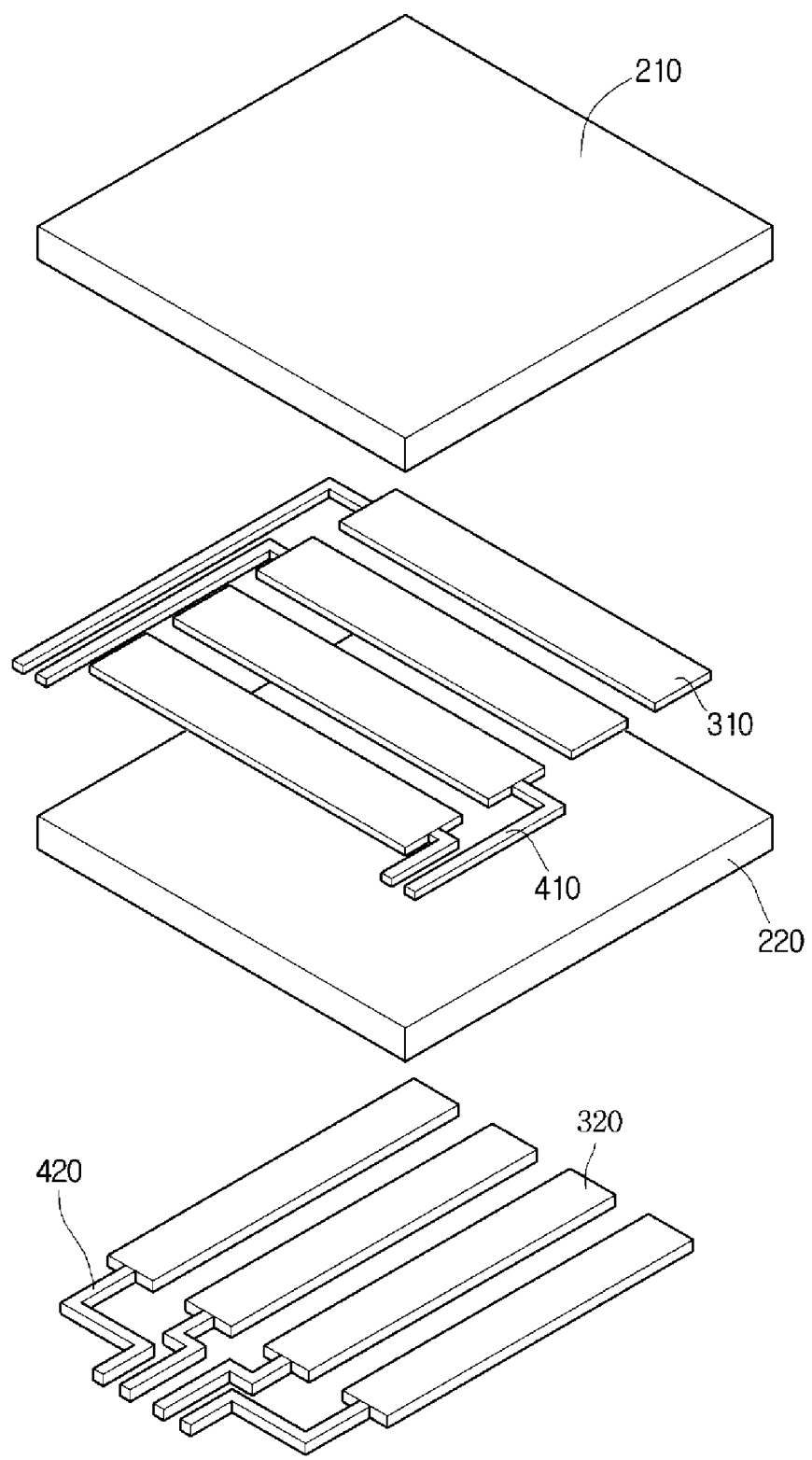
FIG. 8 is another exploded perspective view showing the touch window according to the second embodiment.

In addition, referring to FIG. 8, the cover substrate may not be disposed on the first substrate 210. The first substrate itself may perform a function of the cover substrate and may support electrodes.

Figure 9:
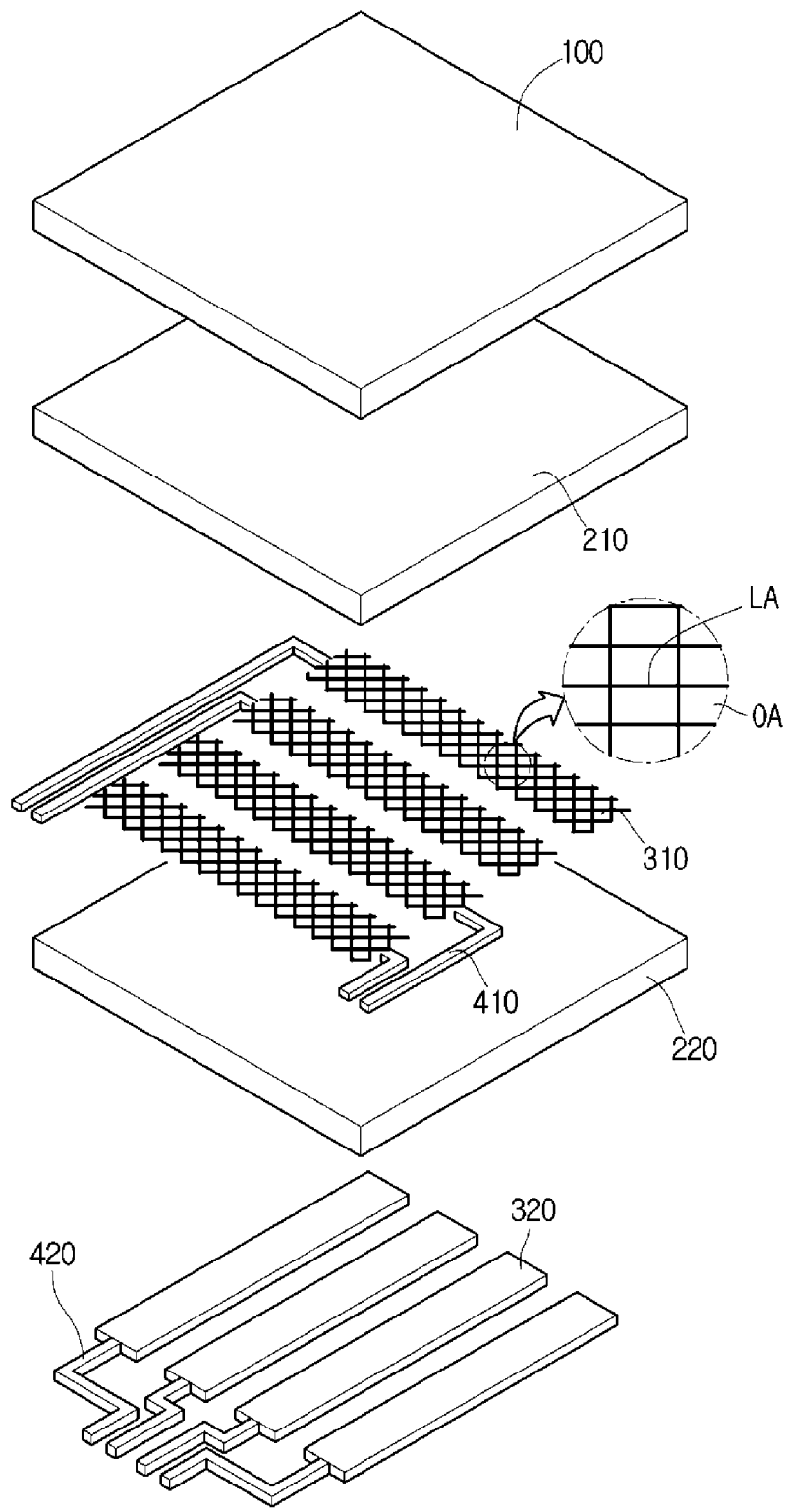
FIG. 9 is still another exploded perspective view showing the touch window according to the second embodiment.
Figure 10:
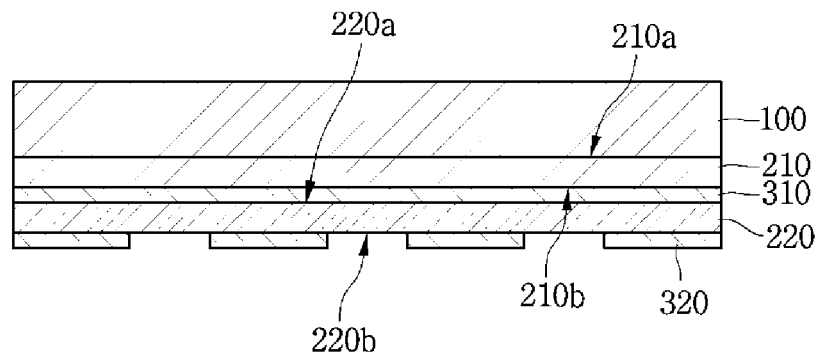
FIG. 10 is a sectional view taken along line B-B' of FIG. 7.

In addition, referring to FIG. 9, the cover substrate 100 may be disposed on the first substrate 210, and an electrode having a mesh shape may be disposed on at least one of the first and second substrates 210 and 220.

Hereinafter, the touch window according to the second embodiment will be described focused on FIG. 7 in which the cover substrate disposed is depicted.

Figure 7:
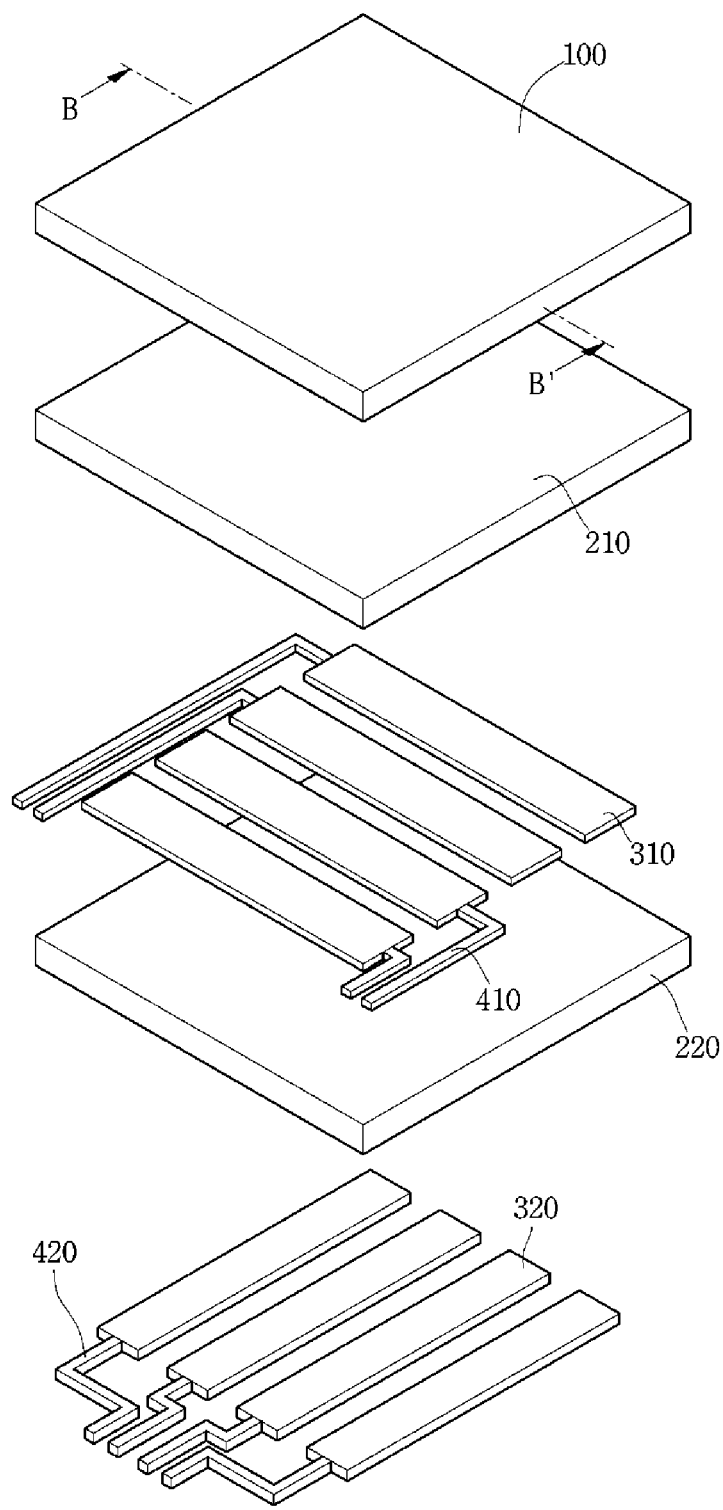
FIG. 7 is an exploded perspective view showing a touch window according to the second embodiment.

Referring to FIG. 7, transparent adhesive layers such as optical clear adhesive (OCA) layers may be interposed between the cover substrate 100 and the first substrate 210 and between the first and second substrates 210 and 220, so that the cover substrate 100 and the first and second substrates 210 and 220 may adhere to each other.

The first substrate 210 may include two surfaces according to a positional relationship with the cover substrate 100. In detail, the first substrate 210 may include a first surface 210a facing the cover substrate 100 and a first opposite surface 210b opposite to the first surface 210a.

In addition, the second substrate 220 may include both surfaces according to a positional relationship with the first substrate 210. In detail, the second substrate 220 may include a second surface 220a facing the first substrate 210 and a second opposite surface 220b opposite to the second surface 220a.

The first sensing and wire electrodes 310 and 410 may be disposed on the first substrate 210. In detail, the first sensing and wire electrodes 310 and 410 may be disposed on the first opposite surface 210b of the first substrate 210.

In addition, the second sensing and wire electrodes 320 and 420 may be disposed on the second substrate 220. In detail, the second sensing and wire electrodes 320 and 420 may be disposed on the second opposite surface 220b of the second substrate 220.

Figure 11:
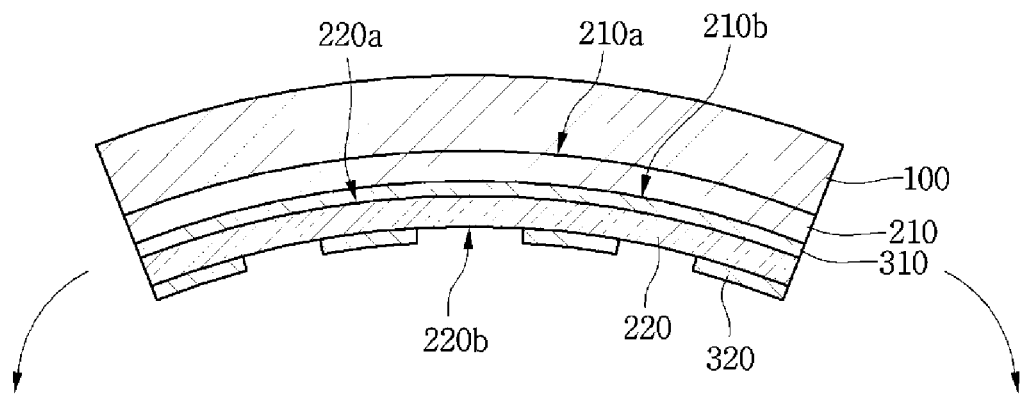
FIG. 11 is another sectional view taken along line B-B' of FIG. 7.
Figure 12:
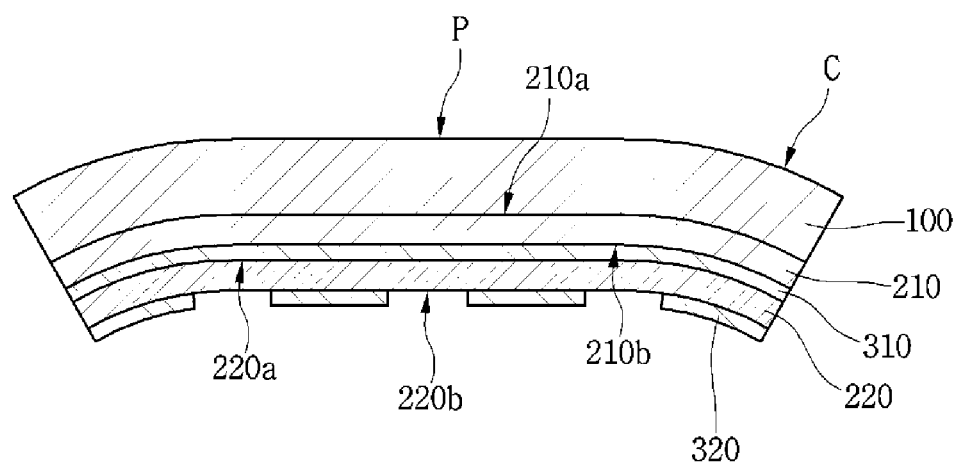
FIG. 12 is still another sectional view taken along line B-B' of FIG. 7.
Figure 13:
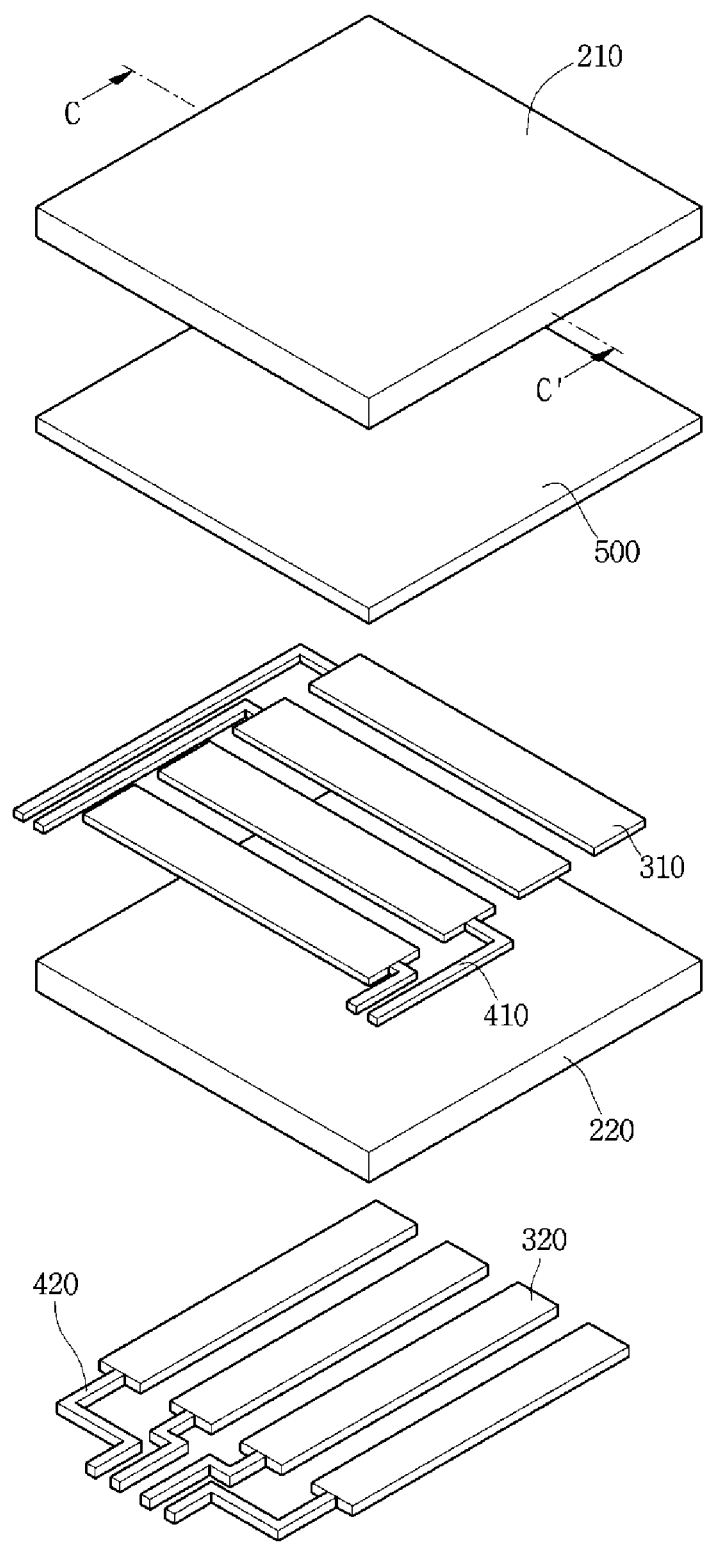
FIG. 13 is an exploded perspective view showing a touch window according to the third embodiment.
Figure 14:
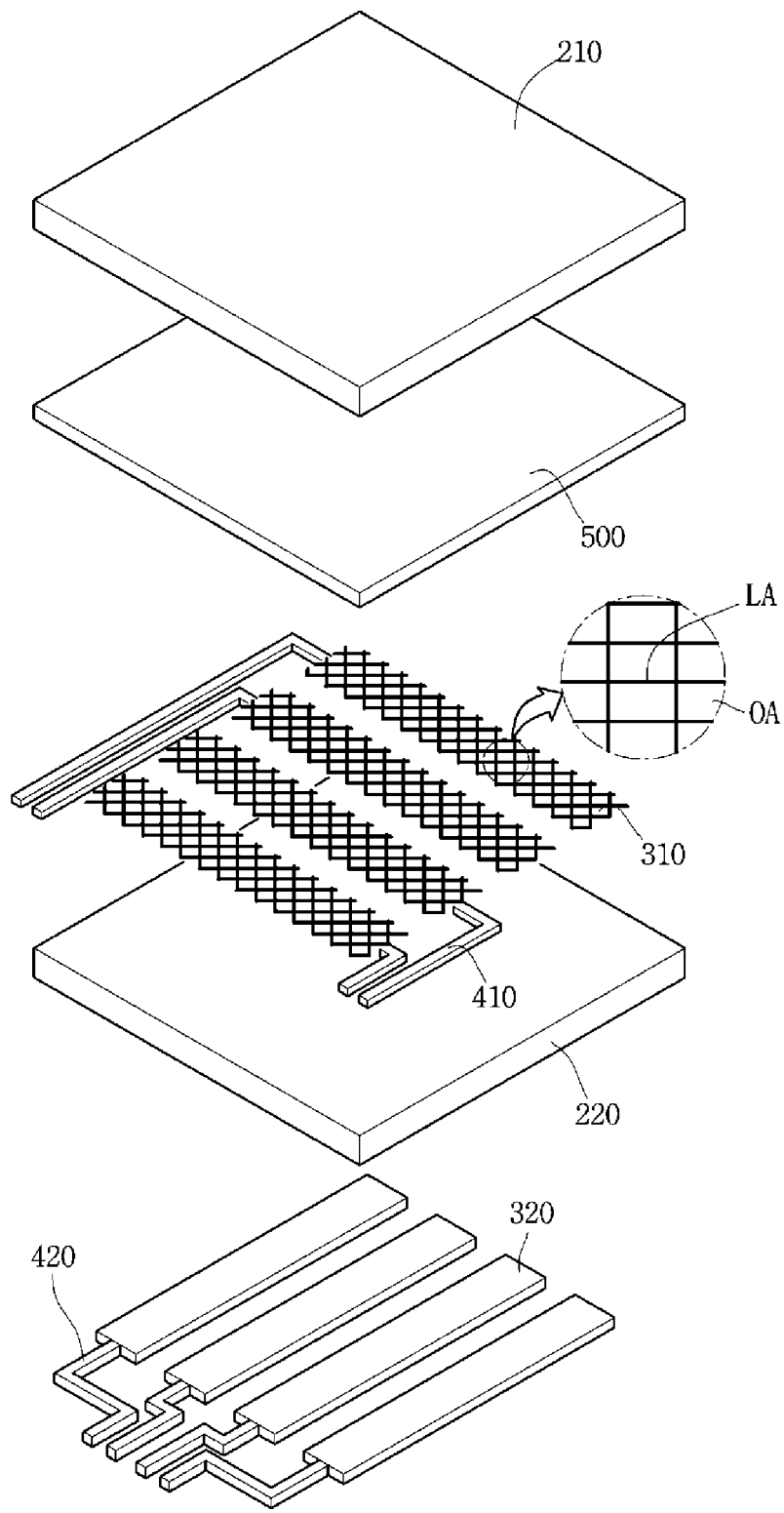
FIG. 14 is another exploded perspective view showing a touch window according to the third embodiment.

Referring to FIGS. 11 and 12, the first and second substrates 210 and 220 may be a curved or flexible substrate.

In detail, the first and second substrate 210 and 220 may entirely or partially have curved surfaces.

Referring to FIG. 11, the first and second substrates 210 and 220 may be flexible while entirely having curved surfaces.

In addition, referring to FIG. 12, the first and second substrates 210 and 220 may be bent while having partial curved surfaces. That is, referring to FIG. 12, the first and second substrates 210 and 220 may be bent while having partial flat surfaces P and partial curved surfaces C. In detail, ends of the first and second substrates 210 and 220 may be bent while having curved surfaces.

Since the first and second substrates 210 and 220 include both the flat surfaces P and the curved surfaces C, a touch operation and the display area may be utilized through the flat surfaces similarly to the related art. At the same time, the display area having the curved surfaces may be utilized, so that various touches and convenience may be provided to a user.

The first and second substrates 210 and 220 may have curved surfaces or be bent in the first and second opposite directions.

Since the first sensing electrode 310 is disposed on the first opposite surface 210a of the first substrate 210 and the second sensing electrode 320 is disposed on the second opposite surface 210a of the second substrate 220, the first and second sensing electrodes 310 and 320 may be disposed on inner surfaces of the first and second bendable substrates 210 and 220. That is, the first and second sensing electrodes 310 and 320 may be disposed on compressed surfaces of the first and second substrate 210 and 220.

That is, the first and second opposite surfaces 210b and 220b of the first and second substrates 210 and 220 on which the first and second sensing electrodes 310 and 320 are disposed may be the same as the inner surfaces of the first and second bendable substrate 210 and 220, and the compressed surfaces of the first and second substrate 210 and 220.

When the first and second substrates 210 and 220 have curved surfaces or are bent, various stresses such as compressive force, tension and shearing force may be applied to the first and second sensing electrodes 310 and 320, so that the first and second sensing electrodes 310 and 320 may be modified or damaged due to the stresses.

In this case, the stress applied to the first and second sensing electrodes 310 and 320 may be reduced when the first and second sensing electrodes 310 and 320 are disposed on the inner surfaces and the compressed surfaces of the first and second bendable substrates 210 and 220, as compared with when the first and second sensing electrodes 310 and 320 are disposed on the outer surfaces, that is, the expanded surfaces of the first and second substrate 210 and 220.

Thus, when the first and second substrates 210 and 220 have curved surfaces or are bent, the first and second sensing electrodes 310 and 320 may be prevented from being damaged due to stresses, so that the bending property and reliability of the flexible touch window may be improved.

Hereinafter, a touch window according to the third embodiment will be described with reference to FIGS. 13 to 17. In the following description of the touch window according to the third embodiment, the detailed descriptions about the parts similar or identical to those described in the touch windows of the first and/or second embodiments will be omitted in order to avoid redundancy.

Referring to FIGS. 13 to 17, a touch window according to the third embodiment may include first and second substrates 210 and 220, and an intermediate layer 500.

A cover substrate (not shown) may be further disposed on the first substrate 210. In addition, the first substrate 210 may support electrodes while performing a function of the cover substrate.

The intermediate layer 500 140 may be disposed on the first substrate 210. The second substrate 220 may be disposed on the intermediate layer 500. In detail, the intermediate layer 500 may be disposed below the first substrate 210 and the second substrate 220 may be disposed below the intermediate layer 500.

A transparent adhesive layer such as an OCA layer may be interposed between the first substrate 210 and the intermediate layer 500, so that the first substrate and the intermediate layer 500 may adhere to each other.

The intermediate layer 500 may include two surfaces according to a positional relationship with the first substrate 210. In detail, the intermediate layer 500 may include a first surface 500a facing the first substrate 210 and a first opposite surface 500b opposite to the first surface 500a.

In addition, the second substrate 220 may include both surfaces according to a positional relationship with the intermediate layer 500. In detail, the second substrate 220 may include a second surface 220a facing the intermediate layer 500 and a second opposite surface 220b opposite to the second surface 220a.

The first sensing and wire electrodes 310 and 410 may be disposed on the intermediate layer 500. In detail, the first sensing and wire electrodes 310 and 410 may be disposed on the first opposite surface 500b of the intermediate layer 500.

In addition, the second sensing and wire electrodes 320 and 420 may be disposed on the second substrate 220. In detail, the second sensing and wire electrodes 320 and 420 may be disposed on the second opposite surface 220b of the second substrate 220.

The intermediate layer 500 may support the second sensing and wire electrodes 320 and 420 while insulating the first and second sensing electrodes 310 and 320 from each other.

The intermediate layer 500 may include a material different from the first substrate 210 and/or the second substrate 220. For example, intermediate layer 500 may include a dielectric material.

For example, the intermediate layer 500 may include an insulating group including halogen compound of alkali metal or alkali earth metal, such as LiF, KCl, CaF2, or MgF2, or fused silica, such as SiO2, SiNX, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as $ZnO_x$, ZnS, ZnSe, $TiO_x$, $WO_x$, $MoO_x$, or $ReO_x$; an organic semiconductor group including Alq3, NPB, TAPC, 2TNATA, CBP or Bphen; and a low-K material such as silsesquioxane or a derivative $((H-SiO_{3/2})_n)$ thereof, methylsilsesquioxane $(CH_3-SiO_{3/2})_n)$, porous silica or porous silica doped with fluorine or carbon atoms, porous zinc oxide $(ZnO_x)$, cyclized-perfluoropolymer (CYTOP) or a mixture thereof.

In addition, the intermediate layer 500 may have visible ray transmittance of about 75% to 99%.

In this case, a thickness of the intermediate layer 500 may be less than those of the substrates 210 and 220. In detail, the thickness of the intermediate layer 500 may be about 0.01 to about 0.1 times those of the substrates 210 and 220. For example, the thicknesses of the substrates 210 and 220 may be equal to about 0.1 mm and the thickness of the intermediate layer 500 may be equal to about 0.001 mm The intermediate layer 500 may be directly disposed on a top surface of the second substrate 220. That is, a dielectric material may be directly coated on the top surface of the second substrate 220 on which the second sensing electrode 320 is disposed, such that the intermediate layer 500 may be formed. Then, the first sensing electrode 310 may be disposed on the intermediate layer 500.

Thus, the touch window according to the third embodiment may have a thickness less than that of the structure having two substrates according to the related art. Specifically, the intermediate layer may substitute for one substrate and the adhesive layer so that the touch window having a thin thickness may be secured.

In addition, in the structure in which two substrates are stacked according to the related art, OCA is further required between the substrates. However, according to the touch window of the third embodiment, a single substrate is used and the sensing electrode is directly formed on the intermediate layer, so that the OCA may be omitted, thereby reducing the cost.

That is, by securing the touch window having a thin thickness through the intermediate layer, the transmittance may be improved.

Figure 15:
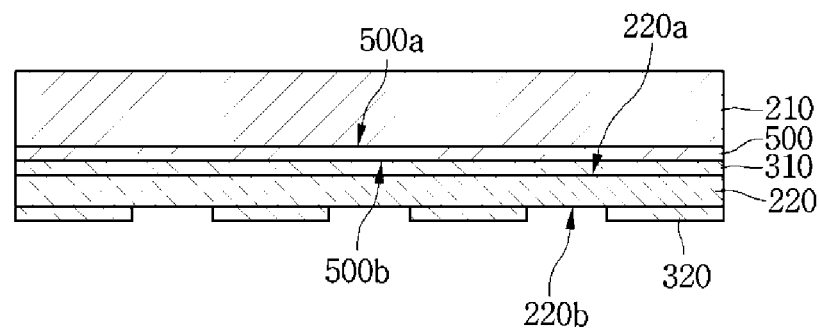
FIG. 15 is a sectional view taken along line C-C' of FIG. 13.
Figure 16:
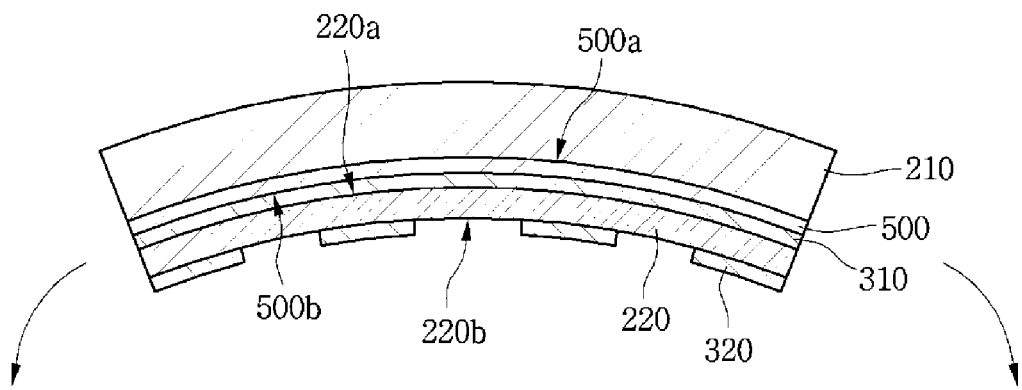
FIG. 16 is another sectional view taken along line C-C' of FIG. 13.
Figure 17:
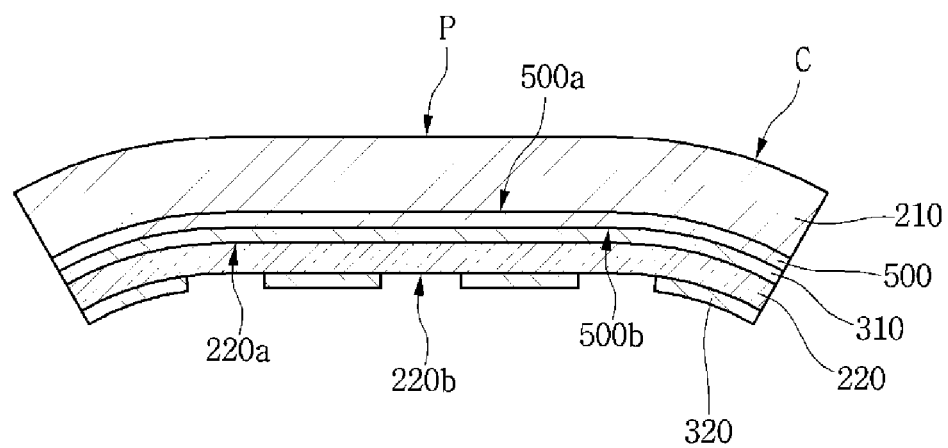
FIG. 17 is still another sectional view taken along line C-C' of FIG. 13.
Figure 18:
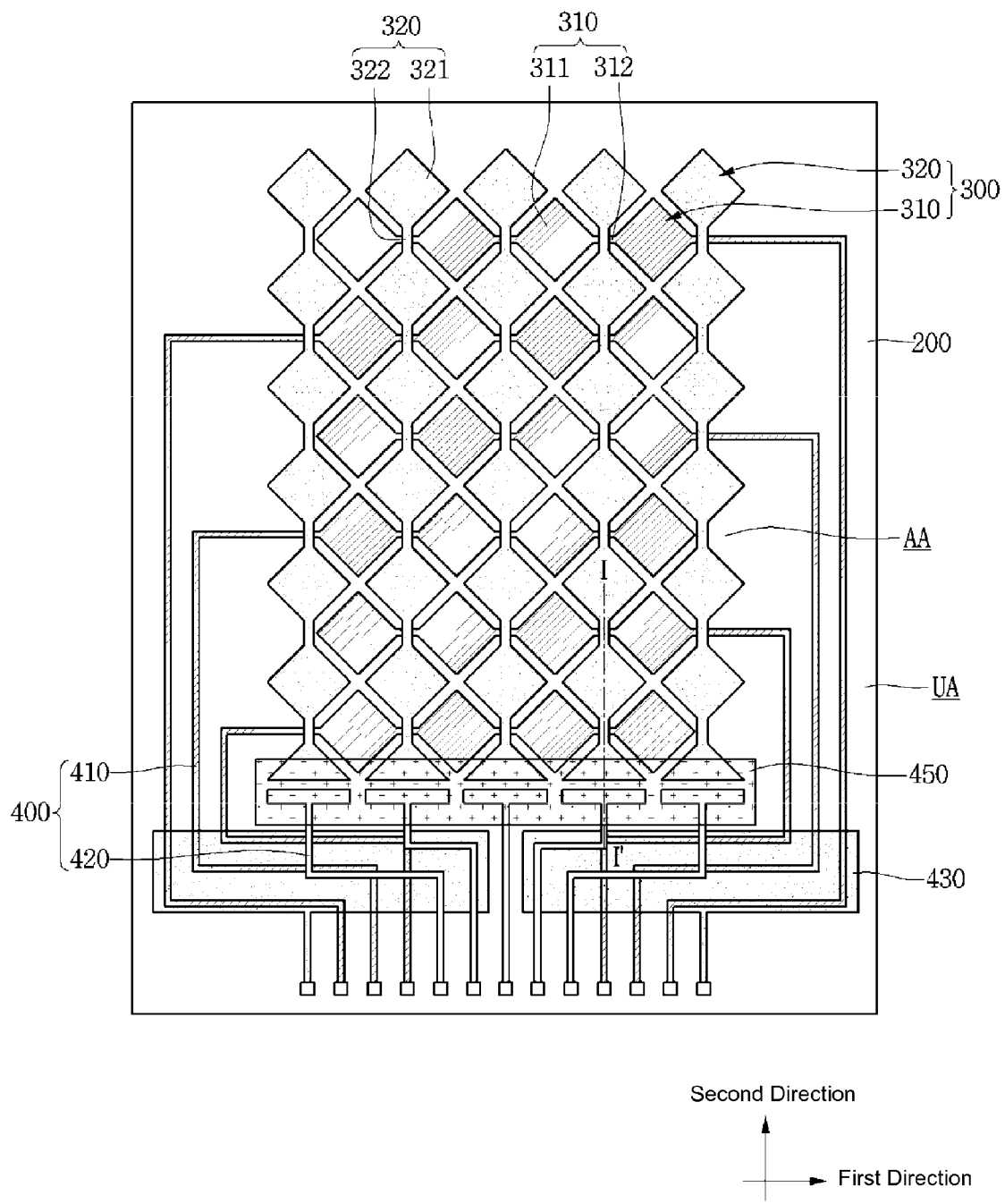
FIG. 18 is a plan view showing a touch window according to the fourth embodiment.
Figure 19:
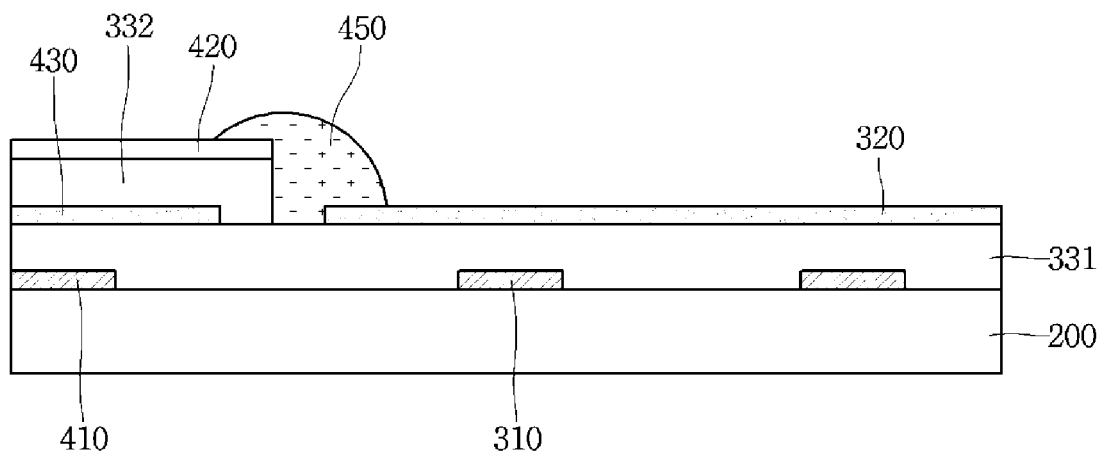
FIG. 19 is a sectional view showing the touch window according to the fourth embodiment.

Referring to FIGS. 15 and 16, the intermediate layer 500 and the substrate 200 may have curved surfaces or be bent. For example, the intermediate layer 500 and the substrate 200 may have curved surfaces or be bent in the directions of the first and second opposite surfaces of the intermediate layer 500 and the substrate 200.

In detail, the intermediate layer 500, and the first and second substrates 210 and 220 may have entirely or partially curved surfaces.

Referring to FIG. 15, the intermediate layer 500, and the first and second substrates 210 and 220 may be flexible while having entirely curved surfaces.

In addition, referring to FIG. 16, the intermediate layer 500, and the first and second substrates 210 and 220 may be bent while having partial curved surfaces. That is, referring to FIG. 16, the intermediate layer 500, and the first and second substrates 210 and 220 may be bent while having partial flat surfaces P and partial curved surfaces C. In detail, ends of the intermediate layer 500 and the first and second substrates 210 and 220 may be bent while having curved surfaces.

Since the intermediate layer 500, and the first and second substrates 210 and 220 include both the flat surfaces P and the curved surfaces C, a touch operation and the display area may be utilized through the flat surfaces similarly to the related art and at the same time, the display area having the curved surface may be utilized, so that various touches and convenience may be provided to a user.

Since the first sensing electrode 310 is disposed on the first opposite surface 500a of the intermediate layer 500 and the second sensing electrode 320 is disposed on the second opposite surface 200b of the substrate 200, the first and the second electrodes 310 and 320 may be disposed on inner surfaces of the bendable intermediate layer 500 and the bendable substrate 200. That is, the first and second electrodes 310 and 320 may be disposed on compressed surfaces of the intermediate layer 500 and the substrate 200.

That is, the first and second opposite surfaces 500b and 200b of the intermediate layer 500 and the substrate 200 on which the first and second sensing electrodes 310 and 320 are disposed may be the same as the inner surfaces of the bendable intermediate layer 500 and the bendable substrate 200 and the compressed surfaces of the intermediate layer 500 and the substrate 200.

When the intermediate layer 500 and the substrate 200 have curved surfaces or are bent, various stresses such as compressive force, tension and shearing force may be applied to the first and second sensing electrodes 310 and 320, so that the first and second sensing electrodes 310 and 320 may be modified or damaged due to the stresses.

In this case, the stress applied to the first and second sensing electrodes 310 and 320 may be reduced when the first and second sensing electrodes 310 and 320 are disposed on the inner surfaces and the compressed surfaces of the bendable intermediate layer 500 and the bendable substrate 200, as compared with when the first and second sensing electrodes 310 and 320 are disposed on outer surfaces, that is, the expanded surfaces of the intermediate layer 500 and the substrate 200.

Thus, when the intermediate layer 500 and the substrate 200 have curved surfaces or are bent, the first and second sensing electrodes 310 and 320 each disposed on the intermediate layer 500 and the substrate 200 may be prevented from being damaged due to stresses, so that the bending property and reliability of the flexible touch window may be improved.

Hereinafter, a touch window according to the fourth embodiment will be described with reference to FIGS. 18 to 21. In the following description of the touch window according to the fourth embodiment, the detailed descriptions about the parts similar or identical to those described in the touch windows of the first to third embodiments will be omitted in order to avoid redundancy.

Referring to FIGS. 18 to 21, a touch window according to the fourth embodiment may include a substrate 200 divided into an active area AA and an unactive area UA.

The wire electrode 400 may be disposed on the unactive area UA of the substrate 200. An electrical signal may be applied to the sensing electrode 300 through the wire electrode 400. The wire electrode 400 may include the first and second electrodes 410 and 420. The wire electrode 400 may be disposed on the unactive area UA and may not be viewed from an outside due to the printing layer disposed on the unactive area.

The wire electrode 400 may include a material equal to or different from that of the sensing electrode 300 formed on the active area AA and described above. In addition, the wire electrode 400 may be formed through a process equal to or different from that of the sensing electrode 300.

Meanwhile, although not shown in the drawings, a printed circuit board connected to the wire electrode 400 may be further placed. Various types of printed circuit boards may serve as the printed circuit board. For example, a flexible printed circuit board (FPCB) may be applied as the printed circuit board.

In addition, a printing layer (not shown) may be formed on the unactive area UA of the substrate 200. The printing layer may be coated with a material having a predetermined color, so that the wire 400 and the printed circuit board connecting the wire electrode 400 to an external circuit may not be viewed from the outside.

The printing layer may have a color suitable for a desired outer appearance thereof. For example, the printing layer includes black pigments to represent black. In addition, a desired logo may be formed in the printing layer through various schemes. The printing layer may be formed through deposition, print, and wet coating schemes.

The sensing electrode 300 may be formed on the active area AA of the substrate 200. The sensing electrode 300 may be disposed on the active area AA of the substrate 200 to serve as a sensor for sensing a touch. That is, the sensing electrode 300 may sense whether an input device such as a finger is touched thereon.

The sensing electrode 300 may include the first and second electrodes 310 and 320. The first and second sensing electrodes 310 and 320 may include the same material or mutually different materials. The first sensing electrode 310 may be electrically connected to the first wire electrode 410 and the second sensing electrode 320 may be electrically connected to the second wire electrode 420.

The first and second electrodes 310 and 320 may be disposed on the substrate 200. The first and second electrodes 310 and 320 may be disposed on the same surface of the substrate 200.

The first and second sensing electrodes 310 and 320 may be disposed on the active area AA to sense a touch. In detail, the first sensing electrode 310 may extend on the active area AA in a first direction, and the second sensing electrode 320 may be extend in a second direction different from the first direction. In this case, the first direction may be perpendicular to the second direction.

The first sensing electrode 310 may include a plurality of first electrode parts 311 and connection parts 312. The first electrode parts 311 may extend in the first direction. In this case, the first electrode parts 311 may be electrically connected to each other through the connection parts 312. The first electrode parts 311 and the connection parts 312 may be formed integrally with each other.

Although the first electrode parts 311 disposed in a rhombus shape are depicted in the drawings, the embodiment is not limited thereto and the first electrode parts 311 may be formed in various shapes such as a polygonal shape including a bar shape, a triangular shape and a rectangular shape, a circular shape, a linear shape, an H-shape or an elliptical shape.

The first sensing electrode 310 may be connected to the first wire electrode 410 disposed on the unactive area UA. The first sensing electrode 310 and the first wire electrode 410 may be disposed on the same layer. In addition, the first sensing electrode 310 and the first wire electrode 410 may be formed through the same process. In this case, the first sensing electrode 310 and the first wire electrode 410 may be formed integrally with each other.

In addition, the second sensing electrode 320 may include a plurality of second electrode parts 321 and second connection parts 322. The second electrode parts 321 may extend in the second direction. In this case, the second electrode parts 321 may be electrically connected to each other through the second connection parts 322. The second electrode parts 321 and the second connection parts 322 may be formed integrally with each other.

Although the second electrode parts 321 disposed in a rhombus shape are depicted in the drawings, the embodiment is not limited thereto and the second electrode parts 321 may be formed in various shapes such as a bar shape, a polygonal shape including a triangular shape and a rectangular shape, a circular shape, a linear shape, an H-shape or an elliptical shape.

The first insulating layer 331 may be disposed between the first and second sensing electrode 310 and 320. In addition, a ground wire 430 may overlap the first wire electrode 410 while interposing the first insulating layer 331 therebetween on the first wire electrode 410. That is, a part of the first wire electrode 410 may overlap a part of the ground wire 430.

In detail, the first sensing electrode 310 and the first wire electrode 410 are disposed on the substrate 200, and the first insulating layer 331 is disposed on the first sensing electrode 310 and the first wire electrode 410. Then, the second sensing electrode 320 and the ground wire 430 may be disposed on the first insulating layer 331.

That is, the ground wire 430 may be disposed on the same layer together with the second sensing electrode 320. In addition, the second sensing electrode 320 and the ground wire 430 may be formed through the same process. The second sensing electrode 320 and the ground wire 430 may be formed of the same material and may be spaced apart from each other.

The first insulating layer 331 may be disposed on the entire surface of the substrate 200 on which the first sensing electrode 310 and the first wire electrode 410 are disposed. The first insulating layer 331 may be disposed only on low portions of the second sensing electrode 320 and the ground wire 430. That is, it is sufficient if the first insulating layer 331 has a shape to electrically insulate the first and second sensing electrodes 310 and 320 from each other and the first wire electrode 410 from the ground wire 430.

A second insulating layer 332 is disposed on the ground wire 430. The second wire electrode 420 overlapping the ground wire 430 is disposed on the second insulating layer 332. That is, a part of the ground wire 430 may overlap a part of the second wire electrode 420.

In addition, the first wire electrode 410 may overlap the second wire electrode 420. The first and second wire electrodes 410 and 420 may be disposed on mutually different layers, and at least a part of the second wire electrode 420 may overlap the first wire electrode 410. That is, a part of the first wire electrode 410 may overlap a part of the second wire electrode 420.

In this case, the ground wire 430 may be interposed between the first and second wire electrodes 410 and 420. The shape of the ground wire 430 is not limited to those depicted in the drawings. That is, it is sufficient if the ground wire 430 is disposed between the first and second wire electrodes 410 and 420 in an overlap area of the first and second wire electrodes 410 and 420.

In an area of sequentially stacking the first wire electrode 410, the ground wire 430 and the second wire electrode 420, the first insulating layer 210 is formed between the ground wire 430 and the first wire electrode 410. In addition, the second insulating layer 220 may be formed between the ground wire 430 and the second wire electrode 420.

When the first and second wire electrodes 410 and 420 are disposed on the same layer, since the first and second wire electrodes 410 and 420 must be spaced apart from each other, the bezel is enlarged. In addition, when first and second wire electrodes 410 and 420 are disposed on mutually different layers and overlap each other, parasitic capacitance is generated. Thus, when the first and second wire electrodes 410 and 420 are disposed on mutually different layers and overlap each other, since the first and second wire electrodes 410 and 420 must be disposed not to overlap each other, it is difficult to achieve a narrow bezel. In addition, it is more difficult to achieve a narrow bezel due to a tolerance for allowing the first and second wire electrodes 410 and 420 to be spaced apart from each other.

According to the touch window of the fourth embodiment, since the first and second wire electrodes 410 and 420 overlap each other, there is no need to take into consideration the distance between the first and second wire electrodes 410 and 420 and the tolerance, so that a narrow bezel may be formed. In addition, since the ground wire 430 is formed between the first and second wire electrodes 410 and 420 in the overlap area of the first and second wire electrodes 410 and 420, the parasitic capacitor may be prevented from being generated.

The second insulating layer 332 may surround top and side surfaces of the ground wire 430. The second insulating layer 332 may be spaced apart from the second sensing electrode 320, but the embodiment is not limited thereto. The second insulating layer 332 may be disposed on the entire surface of the substrate 200 on which the ground wire 430 and the second sensing electrode 320 and may expose a part of the second sensing electrode 320. That is, the second sensing electrode 320 may be disposed to be exposed.

A connection part 450 for connecting the second sensing electrode 320 and the second wire electrode 420 to each other may be disposed. That is, the second sensing electrode 320 may be electrically connected to the second wire electrode 420 through the connection part 450.

The connection part 450 may be formed through a printing process. For example, the second sensing electrode 320 may be electrically connected to the second wire electrode 420 through a printing process of Ag paste, but the embodiment is not limited thereto. It is sufficient if the connection part 450 has a configuration of electrically connecting the second sensing electrode 320 to the second wire electrode 420.

Figure 20:
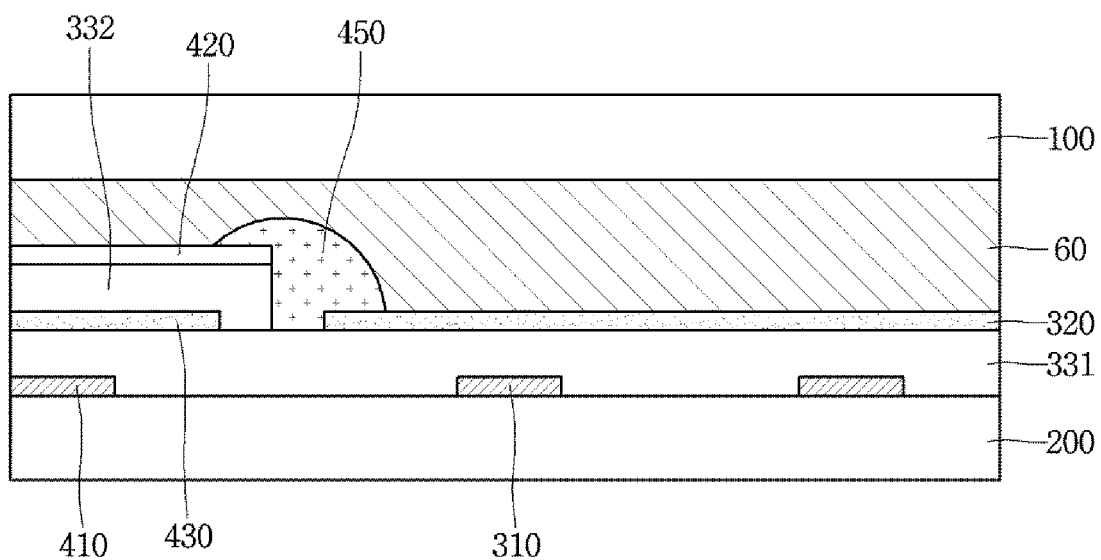
FIG. 20 is another sectional view showing the touch window according to the fourth embodiment.

Referring to FIG. 20, the touch window according to the fourth embodiment includes a substrate 200 which is divided into a display area and a non-display area. The first sensing electrode 310 is disposed in the display area on the substrate 200 and the first wire electrode 410 is disposed in the non-display area. The first insulating layer 331 is formed on the first sensing electrode 310 and the first wire electrode 410.

The ground wire 430, a part of which overlaps the second sensing electrode 320 extending in a direction different from the first sensing electrode 310 and the first wire electrode 410, is disposed on the first insulating layer 331. The second insulating layer 332 is disposed on the ground wire 430 to surround the ground wire 430 and expose the second sensing electrode 320.

The second wire electrode 420 is disposed on the second insulating layer 332 to allow at least a part of the second wire electrode 420 to overlap the first wire electrode 410 and the ground wire 430. In addition, the connection part 450 is disposed to electrically connect the second wire electrode 420 to the second sensing electrode 320.

The cover substrate 100 is disposed on the substrate 200 on which the connection part 450. The cover substrate 100 may be disposed on the substrate 200 on which the first and second sensing electrodes 310 and 320 and the first and second wire electrodes 410 and 420.

An adhesive layer 60 may be disposed between the substrate 200 and the cover substrate 100. For example, the adhesive layer 60 may include optical clear adhesive (OCA) or optical clear resin (OCR).

Thus, at least a part of the second wire electrode 420 is disposed to overlap the first wire electrode 410. The ground wire 430 is disposed between the first and second wire electrodes 410 and 420 in the overlap area of the first and second wire electrodes 410 and 420. For this reason, the bezel may be narrowed so that the parasitic capacitance may be prevented from being generated.

Figure 21:
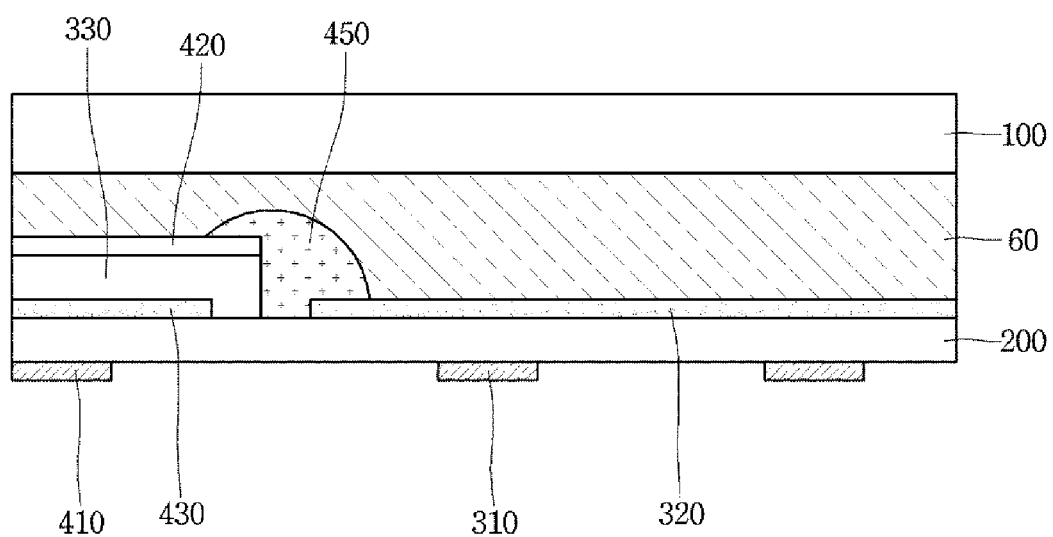
FIG. 21 is still another sectional view showing the touch window according to the fourth embodiment.

Referring to FIG. 21, the touch window according to the fourth embodiment includes a substrate 200 which is divided into an active area and an unactive area. The sensing electrode is disposed on the active area of the substrate 200 and the wire electrode is disposed on the unactive area of the substrate 200. An electrical signal may be applied to the sensing electrode through the wire electrode and the wire electrode is formed on the unactive area, so that the wire electrode is not viewed. In addition, the circuit board connected to the wire electrode may be placed in the unactive area.

The sensing electrode may include first and second sensing electrodes 310 and 320. The first and second sensing electrodes 310 and 320 may include the same material or mutually different materials.

The wire electrode may include first and second wire electrodes 410 and 420. The first wire electrode 410 may be electrically connected to the first sensing electrode 310 and the second wire electrode 420 may be electrically connected to the second sensing electrode 320.

The first and second sensing electrodes 310 and 320 may be disposed on the active area AA to sense a touch. In detail, the first sensing electrode 310 may extend on the active area AA in a first direction, and the second sensing electrode 320 may be extend in a second direction different from the first direction. In this case, the first direction may be perpendicular to the second direction.

In addition, the first and second sensing electrode 310 and 320 may be disposed on the substrate 200. In this case, the first and second sensing electrodes 310 and 320 may be disposed on mutually different surfaces of the substrate 200. That is, the first sensing electrode 310 may be disposed on a rear surface of the substrate 200, and the second sensing electrode 320 may be disposed on a top surface of the substrate 200. The substrate 200 may be interposed between the first and second sensing electrodes 310 and 320.

In detail, the first sensing electrode 310 and the first wire electrode 410 formed integrally with the first sensing electrode 310 are disposed on the rear surface of the substrate 200. The second sensing electrode 320 and the ground wire 430, which is spaced apart from the second sensing electrode 320, are formed on the top surface of the substrate 200.

The ground wire 430 may be formed to be interposed between the first wire electrode 410 and the substrate 200. That is, a part of the first wire electrode 410 may overlap a part of the ground wire 430.

The ground wire 430 and the second sensing electrode 320 may be disposed on the same layer. In addition, the second sensing electrode 320 and the ground wire 430 may be formed through the same process. In this case, the second sensing electrode 320 and the ground wire 430 may be formed of the same material and be spaced apart from each other.

The insulating layer 330 is disposed on the ground wire 430. The second wire electrode 420 which overlaps the ground wire 430 is disposed on the insulating layer 330. That is, a part of the ground wire 430 may overlap a part of the second wire electrode 420.

In addition, at least a part of the first wire electrode 410 may overlap at least a part of the second wire electrode 420. That is, the first and second wire electrodes 410 and 420 may be disposed on mutually different layers and a part of the first wire electrode 410 may overlap a part of the second wire electrode 420. The first wire electrode 410 may be disposed on the rear surface of the substrate 200, and the second wire electrode 420 may be disposed on the top surface of the substrate 200.

In this case, the ground wire 430 may be interposed between the first and second wire electrodes 410 and 420. The shape of the ground wire 430 is not limited to those depicted in the drawings. That is, it is sufficient if the ground wire 430 is disposed between the first and second wire electrodes 410 and 420 in an overlap area of the first and second wire electrodes 410 and 420.

In an area of sequentially stacking the first wire electrode 410, the ground wire 430 and the second wire electrode 420, the first insulating layer 210 is formed between the ground wire 430 and the first wire 410. In addition, the second insulating layer 220 may be formed between the ground wire 430 and the second wire 420.

When the first and second wire electrodes 410 and 420 are disposed on mutually different layers on the top and rear surfaces of the substrate 200, since the first and second wire electrodes 410 and 420 must be disposed not to overlap each other, it is difficult to achieve a narrow bezel. In addition, it is more difficult to achieve a narrow bezel due to a tolerance for allowing the first and second wire electrodes 410 and 420 to be spaced apart from each other.

According to the touch window of the fourth embodiment, since the first and second wire electrodes 410 and 420 overlap each other, there is no need to take into consideration the distance between the first and second wire electrodes 410 and 420 and the tolerance, so that a narrow bezel may be formed. In addition, since the ground wire 430 is formed between the first and second wire electrodes 410 and 420 in the overlap area of the first and second wire electrodes 410 and 420, the parasitic capacitor may be prevented from being generated.

The insulating layer 330 may surround top and side surfaces of the ground wire 430. The insulating layer 330 may be spaced apart from the second sensing electrode 320, but the embodiment is not limited thereto. The insulating layer 330 may be formed on the entire surface of the substrate 200 on which the ground wire 430 and the second sensing electrode 320 and may expose a part of the second sensing electrode 320. That is, the second sensing electrode 320 may be formed to be exposed.

The connection part 450 for connecting the second sensing electrode 320 and the second wire electrode 420 to each other may be formed. That is, the second sensing electrode 320 may be electrically connected to the second wire electrode 420 through the connection part 450.

The connection part 450 may be formed through a printing process. For example, the second sensing electrode 320 may be electrically connected to the second wire electrode 420 through a printing process of Ag paste, but the embodiment is not limited thereto. It is sufficient if the connection part 450 has a configuration of electrically connecting the second sensing electrode 320 to the second wire electrode 420.

The cover substrate 100 is disposed on at least one surface of the substrate 200. Although the cover substrate 100, which is disposed on the top surface of the substrate 200 on which the second sensing electrode 320 and the second wire electrode 420 are formed, is depicted in the drawings, the cover substrate 100 may be disposed on the rear surface of the substrate 200 on which the first sensing electrode 310 and the first wire electrode 410 are formed.

The adhesive layer 60 may be formed between the substrate 200 and the cover substrate 100. For example, the adhesive layer 60 may include optical clear adhesive (OCA) or optical clear resin (OCR).

Thus, the first wire electrode 410 is disposed to overlap the second wire electrode 410. The ground wire 430 is formed between the first and second wire electrodes 410 and 420 in the overlap area of the first and second wire electrodes 410 and 420. For this reason, the bezel may be narrowed so that the parasitic capacitance may be prevented from being generated.

Figure 22:
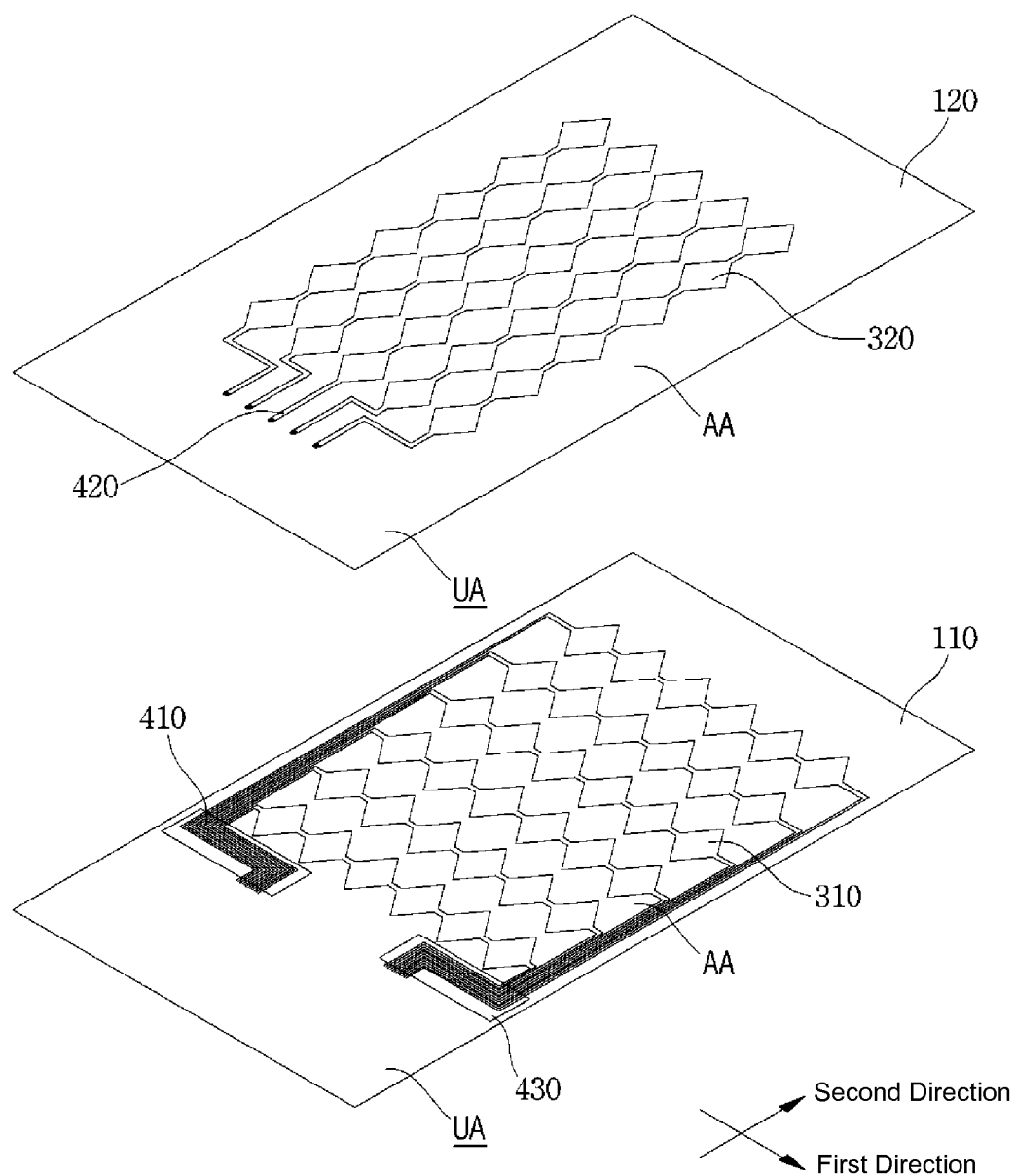
FIG. 22 is an exploded perspective view showing a touch window according to the fifth embodiment.
Figure 23:
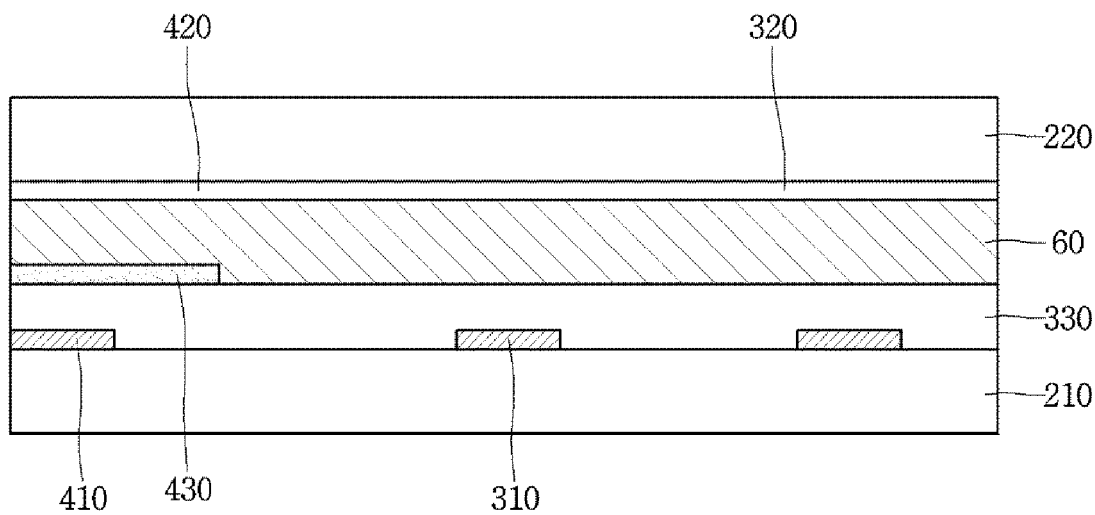
FIG. 23 is a sectional view showing the touch window according to the fifth embodiment.

Hereinafter, a touch window according to the fifth embodiment will be described with reference to FIGS. 22 and 23. In the following description of the touch window according to the fifth embodiment, the detailed descriptions about the parts similar or identical to those described in the touch windows of the first to fourth embodiments will be omitted in order to avoid redundancy.

Referring to FIGS. 18 to 21, a touch window according to the fourth embodiment may include first and second substrates 210 and 220, each of which is divided into an active area AA and an unactive area UA. The second substrate 220 may be disposed on the first substrate 210.

The first sensing electrode 310 is disposed on the active area AA of the first substrate 210 and the first wire electrode 410 is disposed on the unactive area UA of the first substrate 210. The second sensing electrode 320 is disposed on the active area AA of the second substrate 220 and the second wire electrode 420 is disposed on the unactive area UA of the second substrate 220. In addition, a circuit board connected to the first and second wire electrodes 410 and 420 may be placed.

The first and second sensing electrodes 310 and 320 and the first and second wire electrodes 410 and 420 may include the same material or mutually different materials. The first sensing electrode 310 may be electrically connected to the first wire electrode 410 and the second sensing electrode 320 may be electrically connected to the second wire electrode 420.

The first sensing electrode 310 may be formed integrally with the first wire electrode 410. The first sensing electrode 310 and the first wire electrode 410 may be formed through the same process. That is, the first sensing electrode 310 and the first wire electrode 410 may be formed on the same layer and of the same material.

The second sensing electrode 320 may be formed integrally with the second wire electrode 420. The second sensing electrode 320 and the second wire electrode 420 may be formed through the same process. That is, the second sensing electrode 320 and the second wire electrode 420 may be formed on the same layer and of the same material.

The insulating layer 330 is formed on the substrate 200 on which the first sensing electrode 310 and the first wire electrode 410. In addition, the ground wire 601 overlapping the first wire electrode 410 is formed on the insulating layer 330. That is, a part of the ground wire 430 may overlap a part of the first wire electrode 410.

The insulating layer 330 may surround top and side surfaces of the first wire electrode 410. The insulating layer 330 is formed on the entire surface of the substrate 200 as shown in the drawings, but the embodiment is not limited thereto. The insulating layer 330 may be formed only on a low portion of the ground wire 430. It is sufficient if the insulating layer 330 has a shape which is capable of electrically insulating the first wire electrode 410 from the ground wire 430.

The second wire electrode 420 formed on the second substrate 220 and the first wire electrode 410 formed on the first substrate 210 may be formed to overlap at least partially each other. That is, the first and second wire electrodes 410 and 420 may be formed on mutually different layers and a part of the first wire electrode 410 may overlap a part of the second wire electrode 420.

The ground wire 430 may be interposed between the first and second wire electrodes 410 and 420. A shape of the ground wire 430 is not limited to those depicted in the drawings. That is, it is sufficient if the ground wire 430 is interposed between the first and second wire electrodes 410 and 420 in the overlap area of the first and second wire electrodes 410 and 420.

The adhesive layer 60 is formed between the first and second substrates 210 and 220. The adhesive layer 60 may be disposed to be in contact with the ground wire 430. In addition, the adhesive layer 60 may be disposed to be in contact with the second wire electrode 420.

That is, the adhesive layer 60 may be formed between the ground wire 430 and the second wire electrode 420. In addition, the insulating layer 330 may be formed between the ground wire 430 and the first wire electrode 410.

When the first and second wire electrodes 410 and 420 are formed on mutually different substrates and overlap each other, parasitic capacitance is generated. Thus, when the first and second wire electrodes 410 and 420 are formed on mutually different substrates, since the first and second wire electrodes 410 and 420 must be disposed not to overlap each other, it is difficult to achieve a narrow bezel. In addition, it is more difficult to achieve a narrow bezel due to a tolerance for allowing the first and second wire electrodes 410 and 420 to be spaced apart from each other.

According to the touch window of the embodiment, since the first and second wire electrodes 410 and 420 overlap each other, there is no need to take into consideration the distance between the first and second wire electrodes 410 and 420 and the tolerance, so that a narrow bezel may be formed. In addition, since the ground wire 430 is formed between the first and second wire electrodes 410 and 420 in the overlap area of the first and second wire electrodes 410 and 420, the parasitic capacitor may be prevented from being generated.

Hereinafter, a touch window according to the sixth embodiment will be described with reference to FIG. 24. In the following description of the touch window according to the sixth embodiment, the detailed descriptions about the parts similar or identical to those described in the touch windows of the first to fifth embodiments will be omitted in order to avoid redundancy.

Figure 24:
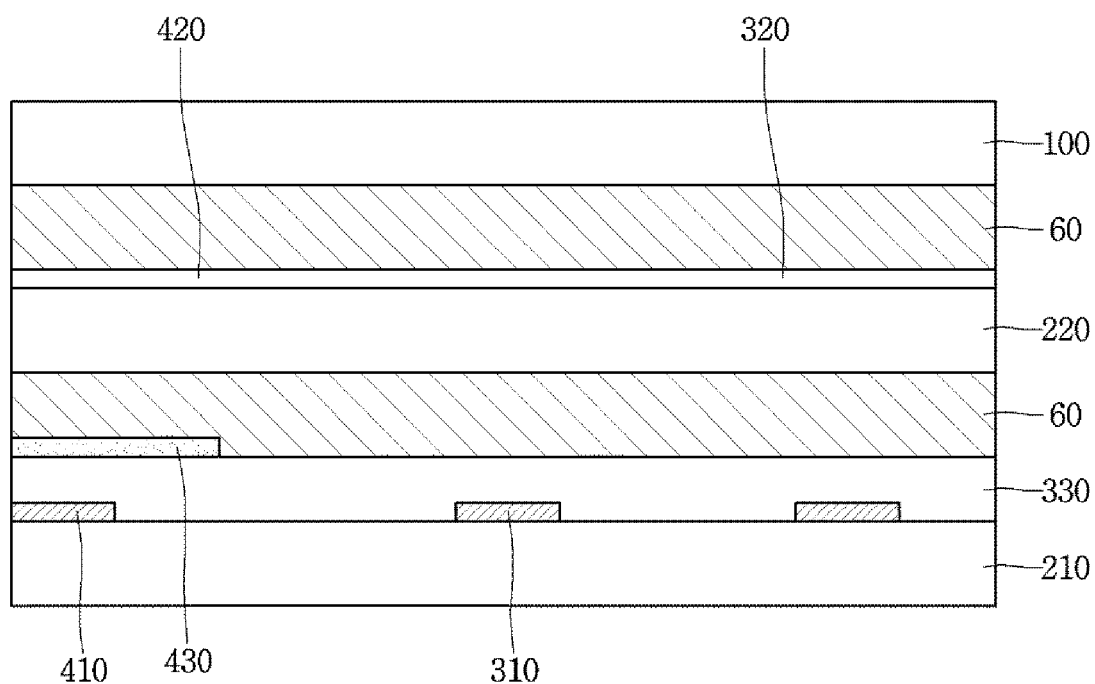
FIG. 24 is a sectional view showing a touch window according to the sixth embodiment.

Referring to FIG. 24, the touch window according to the sixth embodiment includes a first substrate 210 which is divided into an active area and an unactive area, and a second substrate 220 formed on the first substrate 210. A first sensing electrode 310 and a first wire electrode 410 are formed on the first substrate 210. A second sensing electrode 320 and a second wire electrode 420 are formed on the second substrate 220. In addition, a circuit board connected to the first and second wire electrodes 410 and 420 may be placed.

The first and second sensing electrodes 310 and 320 and the first and second wire electrodes 410 and 420 may include the same material or mutually different materials. The first sensing electrode 310 may be electrically connected to the first wire electrode 410 and the second sensing electrode 320 may be electrically connected to the second wire electrode 420.

The first sensing electrode 310 may be formed integrally with the first wire electrode 410. In addition, the second sensing electrode 320 may be formed integrally with the second wire electrode 420.

The first and second wire electrodes 410 and 420 are disposed to partially overlap each other. In this case, a ground wire 430 is disposed between the first and second wire electrodes 410 and 420 in the overlap area of the first and second wire electrodes 410 and 420.

In detail, the insulating layer 330 is formed on the first substrate 210 on which the first sensing electrode 310 and the first wire electrode 410. The ground wire 430 which overlaps the first wire electrode 410 is formed on the insulating layer 330. That is, a part of the ground wire 430 may overlap a part of the first wire electrode 410.

The shape of the ground wire 430 is not limited to that depicted in the drawing. That is, it is sufficient if the ground wire 430 is disposed between the first and second wire electrodes 410 and 420 in the overlap area of the first and second wire electrodes 410 and 420.

The insulating layer 330 may surround top and side surfaces of the first wire electrode 410. The insulating layer 330 is formed on the entire surface of the substrate 100 as shown in the drawing, but the embodiment is not limited thereto. The insulating layer 330 may be formed only on a low portion of the ground wire 430. It is sufficient if the insulating layer 330 has a shape which is capable of electrically insulating the first wire electrode 410 from the ground wire 430.

In this case, the adhesive layer 60 is formed between the first and second substrates 210 and 220. The second sensing electrode 320 and the second wire electrode 420 may be disposed on a top surface of the second substrate 220, and the adhesive layer 60 may be formed on a rear surface of the second substrate 220. That is, the adhesive layer 60 may be disposed to be in contact with the ground wire 430. In addition, the adhesive layer 60 may be disposed to be in contact with the second substrate 220.

That is, the second substrate 220 and the adhesive layer 60 may be formed between the ground wire 430 and the second wire electrode 420. In addition, the insulating layer 330 may be formed between the ground wire 430 and the first wire electrode 410.

Therefore, since the first and second wire electrodes 410 and 420 overlap each other, there is no need to take into consideration the distance between the first and second wire electrodes 410 and 420 and the tolerance, so that a narrow bezel may be formed. In addition, since the ground wire 430 is formed between the first and second wire electrodes 410 and 420 in the overlap area of the first and second wire electrodes 410 and 420, the parasitic capacitor may be prevented from being generated.

Hereinafter, a touch window according to the seventh embodiment will be described with reference to FIGS. 25 and 26. In the following description of the touch window according to the seventh embodiment, the detailed descriptions about the parts similar or identical to those described in the touch windows of the first to sixth embodiments will be omitted in order to avoid redundancy.

Figure 25:
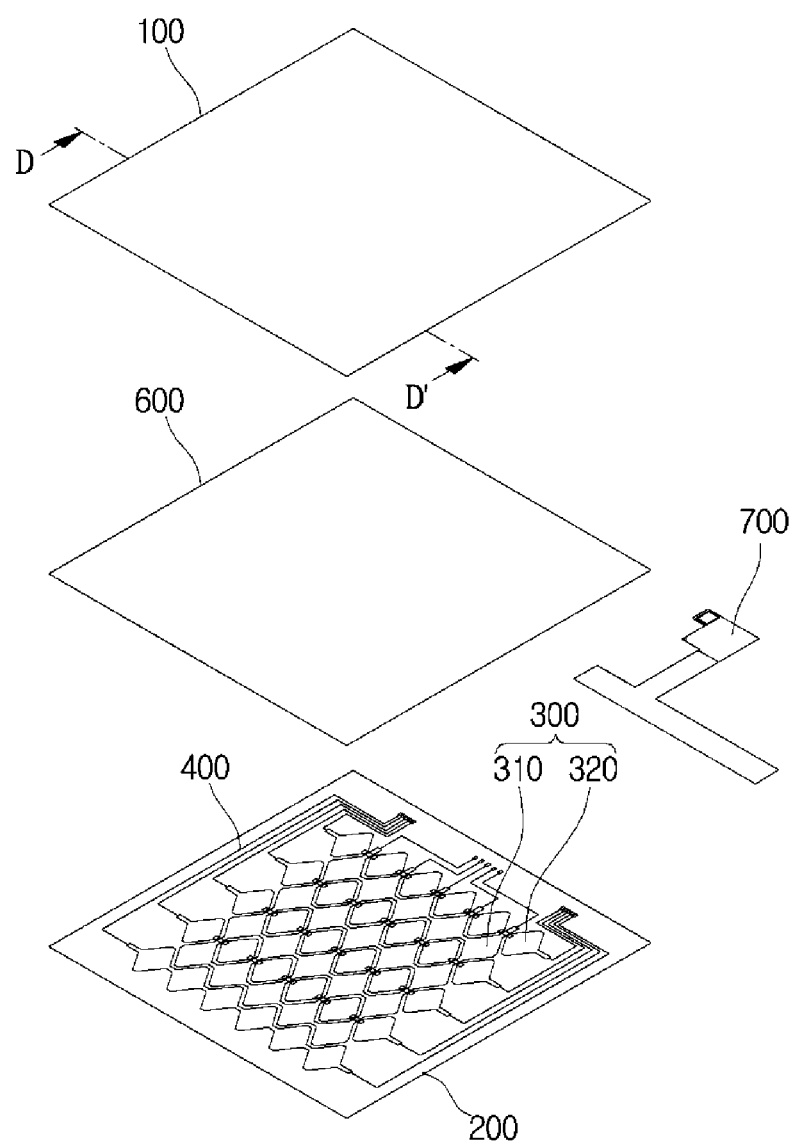
FIG. 25 is an exploded perspective view showing a touch window according to the seventh embodiment.
Figure 26:
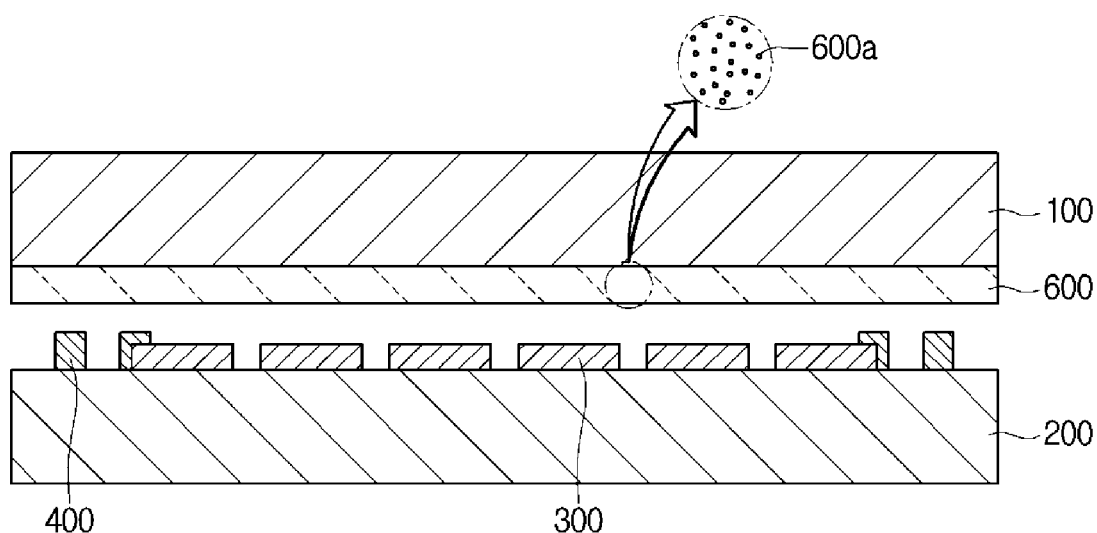
FIG. 26 is a sectional view taken along line D-D' of FIG. 25.

Referring to FIGS. 25 and 26, a touch window according to an embodiment may include a cover substrate 100, a substrate 200, a wire 400 and a printed circuit board 700.

A sensing electrode 300 may be disposed on the substrate 200. The sensing electrode 300 serves as a sensor for sensing a touch. In detail, the substrate 200 may be provided with a first sensing electrode 310 extending in one direction thereon and a second sensing electrode 320 extending in another direction different from the one direction of the first sensing electrode 310 thereon. Meanwhile, although it is shown in the drawings that the difference is not greatly made in the thickness between the substrate 200 and the sensing electrode 300, the difference in the thickness between the substrate 200 and the sensing electrode 300 may be significantly made in an actual product.

Although the sensing electrode 300 disposed in a rhombus shape are depicted in the drawings, the embodiment is not limited thereto and the sensing electrode 310 may be formed in various shapes such as a polygonal shape including a triangular shape and a rectangular shape, a circular shape, a linear shape, an H-shape or an elliptical shape.

The blocking layer 600 may be interposed between the cover substrate 100 and the substrate 200. That is, the blocking layer 600 may be disposed on the sensing electrode 300. The blocking layer 600 may block a part of light incident upon the touch window. In detail, the blocking layer 600 may block the light having a short wavelength. In more detail, the blocking layer 600 may block the light having a wavelength of 300 nm to 800 nm. In detail, the blocking layer 600 may absorb the light having a wavelength of 350 nm to 780 nm. Preferably, the blocking layer 600 may absorb the light having a wavelength of 380 nm to 700 nm.

The blocking layer 600 may include blocking particles 600*a*. The blocking particles 600*a* may include oxide. In detail, the blocking particles 600*a* may include at least one of titanium oxide and zinc oxide.

The blocking particles 600*a* may be distributed into the base. The base may include thermoplastic resin.

The titanium oxide may absorb light to block light. The titanium oxide may absorb the light having a wavelength of 300 nm to 800 nm. In detail, the titanium oxide may absorb the light having a wavelength of 350 nm to 780 nm. Preferably, the titanium oxide may absorb the light having a wavelength of 380 nm to 700 nm.

The zinc oxide may scatter the light having of 300 nm to 800 nm. In detail, the zinc oxide may absorb the light having a wavelength of 350 nm to 780 nm. Preferably, the zinc oxide may absorb the light having a wavelength of 380 nm to 700 nm.

As described above, the blocking layer 600 blocks the incident light having a short wavelength, so that the visibility of the sensing electrode 300 may be improved.

Hereinafter, a touch window according to the eighth embodiment will be described with reference to FIGS. 27 and 29. In the following description of the touch window according to the eighth embodiment, the detailed descriptions about the parts similar or identical to those described in the touch windows of the first to seventh embodiments will be omitted in order to avoid redundancy.

Figure 27:
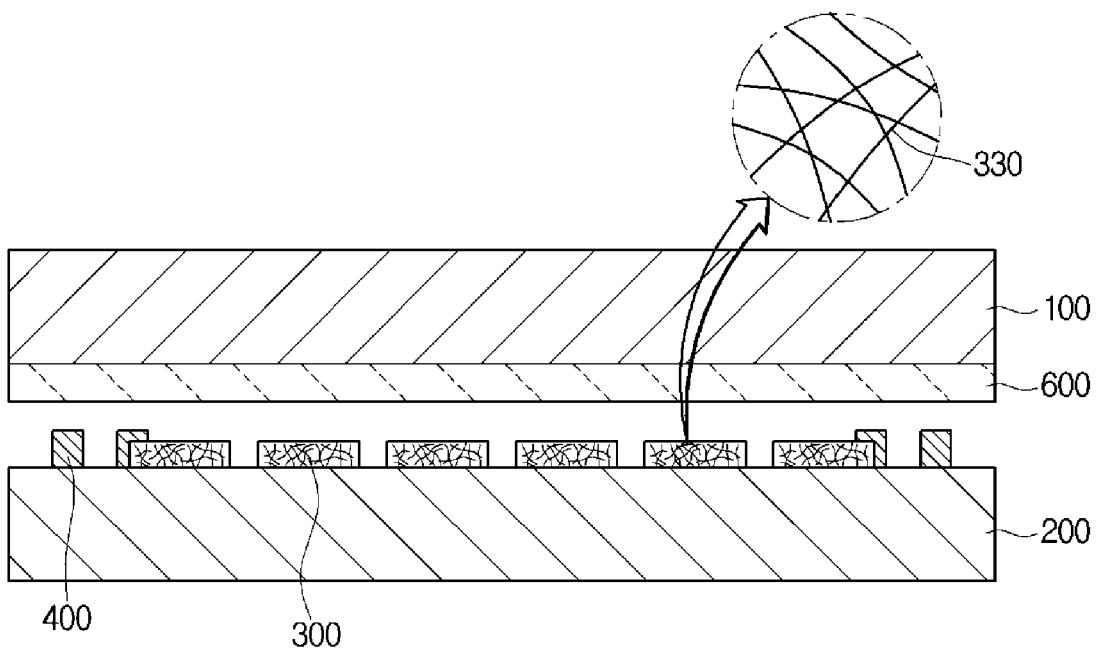
FIGS. 27 to 29 are sectional views showing a touch window according to the eighth embodiment.

Meanwhile, as shown in FIG. 27, the sensing electrode 300 may include an interconnecting structure 330. The interconnecting structure 330 may include a microstructure having a diameter in the range of 5 nm to 300 nm. In detail, the interconnecting structure 330 may include a microstructure having a diameter in the range of 10 nm to 200 nm. Preferably, as one example, the interconnecting structure 330 may include a microstructure having a diameter in the range of 20 nm to 100 nm. The sensing electrode 300 may include a nanowire. The sensing electrode 300 may include a metallic nanowire.

Figure 28:
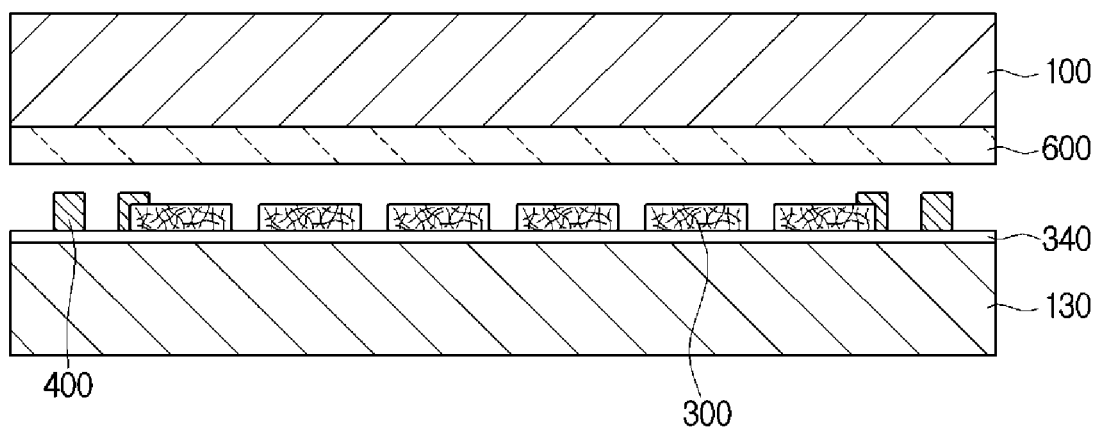

Referring to FIG. 28, the sensing electrode 300 may include a base material 340 and an interconnecting structure 330. The base material 340 includes a photosensitive material. Since the base material 340 include the photosensitive material, the sensing electrode 300 may be formed through exposure and development processes The sensing electrode 300 may include photosensitive nanowire film. The sensing electrode 300 may include the photosensitive nanowire film, so that the thickness of the sensing electrode 300 may be reduced. In other words, the sensing electrode 300 includes the nanowire, and the entire thickness of the sensing electrode 300 may be reduced. Conventionally, when the sensing electrode 300 includes the nanowire, an overcoating layer must be additionally formed to prevent the nanowire from being oxidized, so that the fabricating process may be complicated and the thickness of the touch window may be increased. However, according to the embodiment, the nanowire is provided in the photosensitive material so that the nanowire may be prevented from being oxidized without any overcoating layers.

Specifically, the interconnecting structure has reflectance of about 30% to about 80% in the wavelength band of 300 nm to 800 nm, so that the interconnecting structure allows the visibility to deteriorate. In detail, the interconnecting structure may have reflectance of about 35% to about 75% in the wavelength band of 350 nm to 780 nm. In more detail, the interconnecting structure may have reflectance of about 37% to about 70% in the wavelength band of 380 nm to 700 nm. Thus, the light having a wavelength of 300 nm to 800 nm is blocked through the blocking layer 600, so that the reflectance may be reduced.

In addition, even when the sensing electrode 300 includes a metal weak in light reflection, the light reflectance may be reduced through the blocking layer 600.

Next, the wire 400 is formed on the substrate 200. An electrical signal may be applied to the sensing electrode 300 through the wire 400. The wire 400 may include a material equal or similar to that included in the sensing electrode 300.

Meanwhile, a printed circuit board 700 connected to the wire 400 may be further placed. Various types of printed circuit boards may serve as the printed circuit board 700. For example, a flexible printed circuit board (FPCB) may be applied as the printed circuit board.

Figure 29:
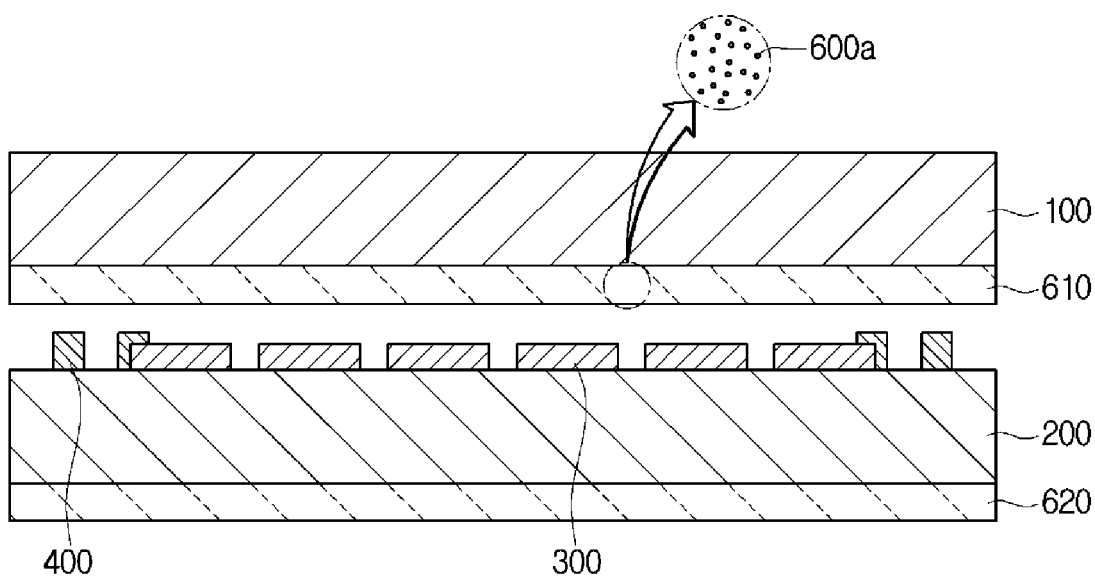

Meanwhile, referring to FIG. 29, the blocking layer may include a first blocking layer 610 disposed on the sensing electrode 300 and a second blocking layer 620 disposed under the sensing electrode 300. That is, the second blocking layer 620 may be disposed below the substrate 200. Thus, the light having a short wavelength and incident from a low portion of the touch window may be prevented from being scattered or reflected.

Hereinafter, a touch window according to the ninth embodiment will be described with reference to FIGS. 30 and 31. In the following description of the touch window according to the ninth embodiment, the detailed descriptions about the parts similar or identical to those described in the touch windows of the first to eighth embodiments will be omitted in order to avoid redundancy.

Figure 30:
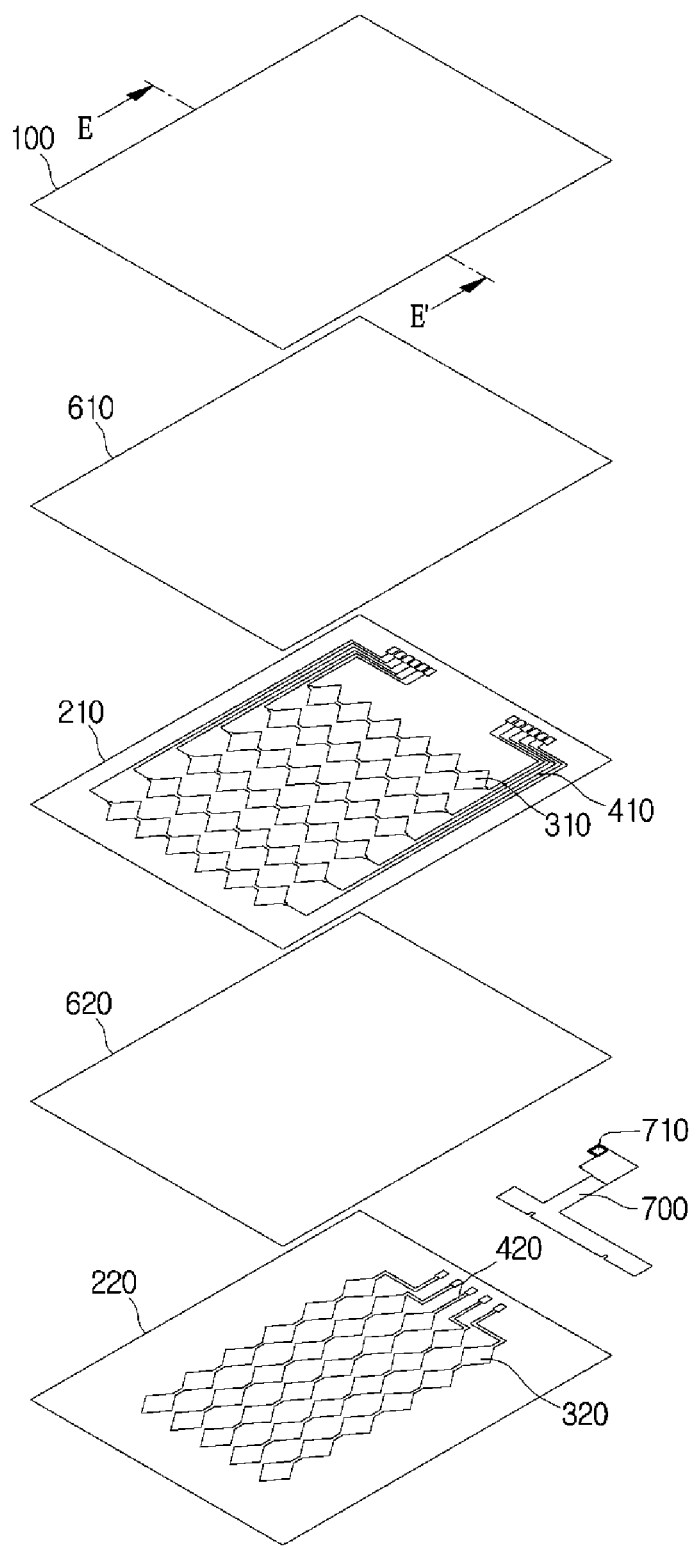
FIG. 30 is an exploded perspective view showing a touch window according to the 9-th embodiment.
Figure 31:
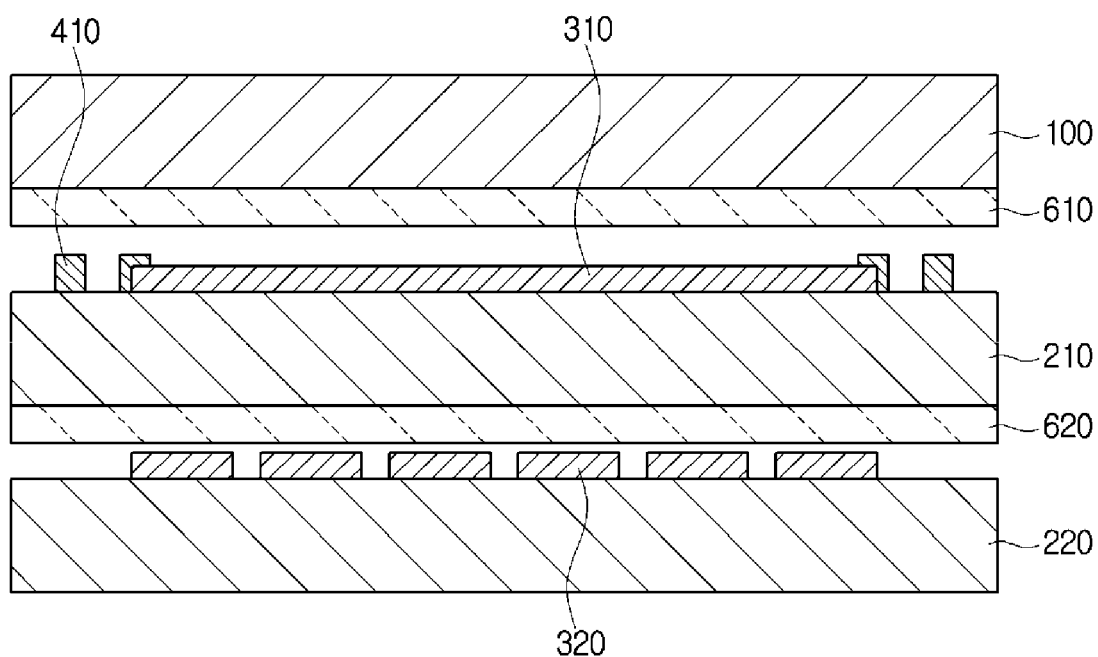
FIG. 31 is a sectional view taken along line E-E' of FIG. 30.

Referring to FIGS. 30 and 31, The first sensing electrode 310 may be formed on the first substrate 210 disposed on the cover substrate 100, and the second sensing electrode 320 may be formed on the second substrate 220 disposed on the first substrate 210. Optical clear adhesive may be interposed between the cover substrate 100, and the first and second substrates 210 and 220. In addition, the first blocking layer 610 may be disposed on the first substrate 210 and the second blocking layer 620 may be disposed on the second substrate 220.

Hereinafter, a touch window according to the tenth embodiment will be described with reference to FIGS. 32 and 33. In the following description of the touch window according to the tenth embodiment, the detailed descriptions about the parts similar or identical to those described in the touch windows of the first to ninth embodiments will be omitted in order to avoid redundancy.

Figure 32:
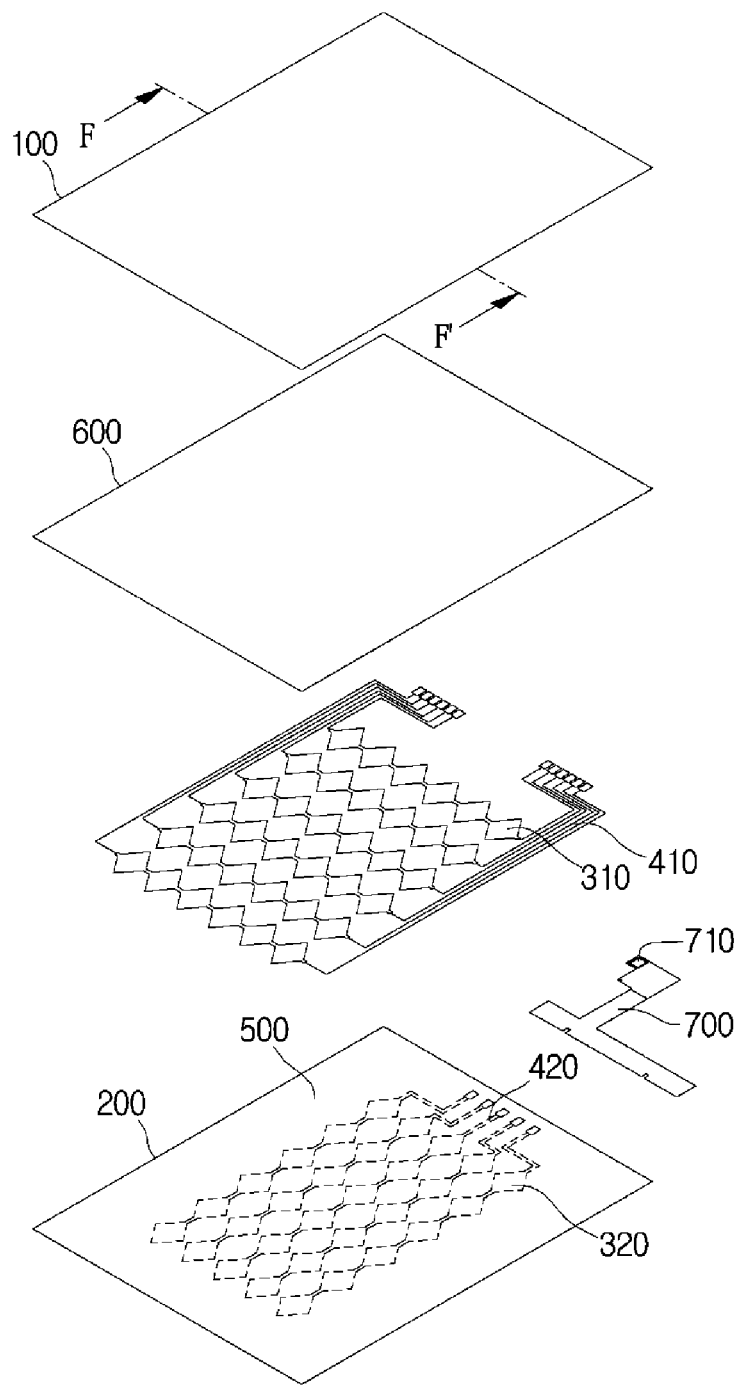
FIG. 32 is an exploded perspective view showing a touch window according to the 10-th embodiment.
Figure 33:
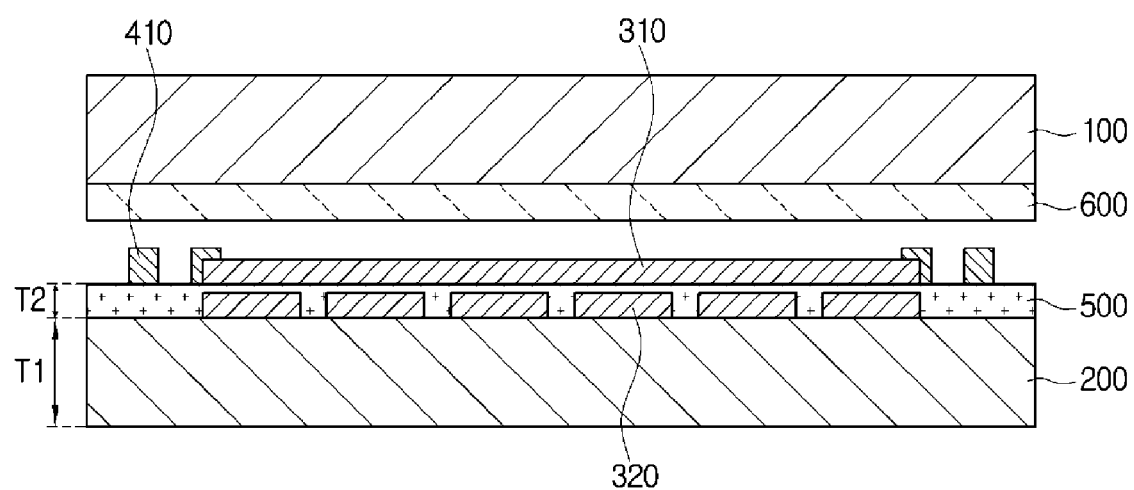
FIG. 33 is a sectional view taken along line F-F' of FIG. 32.

Referring to FIGS. 32 and 33, the intermediate layer 500 may be disposed on the substrate 200. The intermediate layer 500 may be disposed on the second sensing electrode 320. The intermediate layer 500 may support the first sensing electrode 310. At the same time, the intermediate layer 500 may insulate the first and second sensing electrodes 310 and 320 from each other.

In this case, a thickness of the intermediate layer 500 may be less than a thickness of the cover substrate 100. The thickness T2 of the intermediate layer 500 may be less than a thickness T1 of the substrate 200. The thickness T2 of the intermediate layer 500 may be 0.01 to 0.95 times the thickness T1 of the substrate 200. In detail, the thickness T2 of the intermediate layer 500 may be 0.03 to 0.8 times the thickness T1 of the substrate 200. Preferably, the thickness T2 of the intermediate layer 500 may be 0.05 to 0.5 times the thickness T1 of the substrate 200. For example, when the thickness T1 of the substrate 200 is equal to 0.05 mm, the thickness T2 of the intermediate layer 500 may be equal to 0.005 mm.

The intermediate layer 500 may be directly formed on the top surface of the substrate 200. That is, the intermediate layer 500 may be formed by directly coating a dielectric material on the top surface of the substrate 200. Then, the first sensing electrode 310 may be formed on the intermediate layer 500.

By securing the touch window having a thin thickness through the intermediate layer 500, the transmittance may be improved and the first and second sensing electrodes 310 and 320 may be prevented from being cracked. Thus, the bending property and reliability of the touch window may be improved.

Hereinafter, a touch window according to the 11-th embodiment will be described with reference to FIGS. 34 and 35. In the following description of the touch window according to the 11-th embodiment, the detailed descriptions about the parts similar or identical to those described in the touch windows of the first to tenth embodiments will be omitted in order to avoid redundancy.

Figure 34:
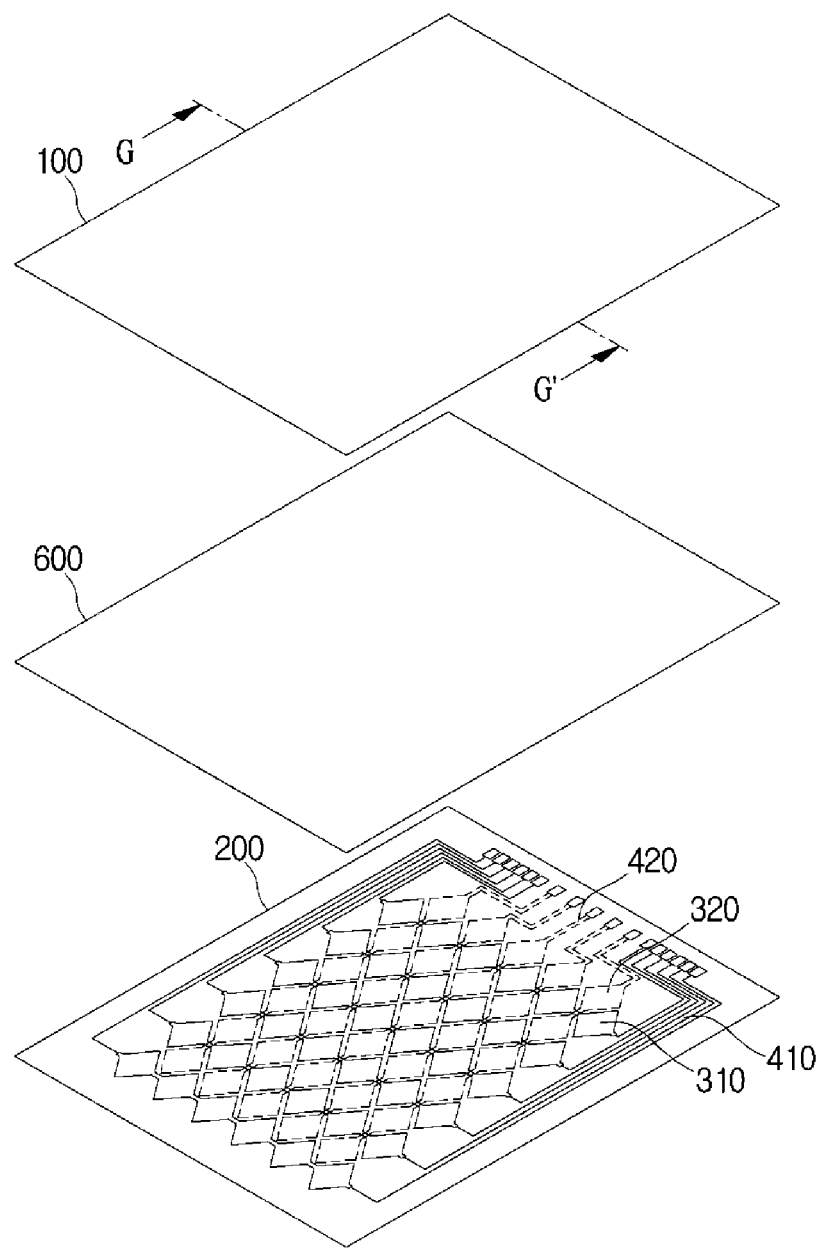
FIG. 34 is an exploded perspective view showing a touch window according to the 11-th embodiment.
Figure 35:
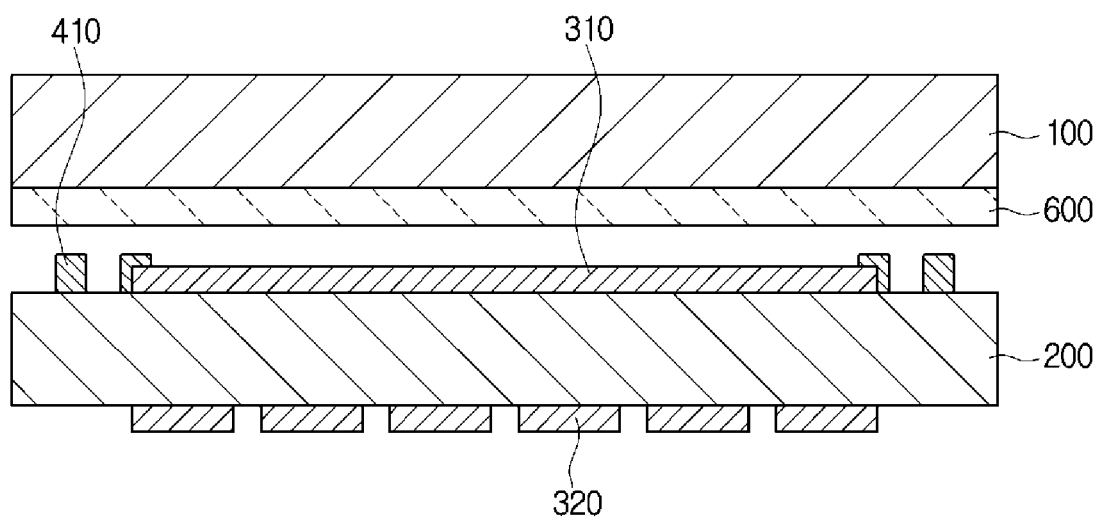
FIG. 35 is a sectional view taken along line G-G' of FIG. 34.

Meanwhile, referring to FIGS. 34 and 35, the first sensing electrode 310 may be formed on one surface of the substrate 200 disposed on the cover substrate 100, and the second sensing electrode 320 may be formed on an opposite surface of the substrate 200. Thus, the thickness of the touch window may be reduced.

Hereinafter, a touch window according to the 12-th embodiment will be described with reference to FIGS. 36 and 37. In the following description of the touch window according to the 12-th embodiment, the detailed descriptions about the parts similar or identical to those described in the touch windows of the first to eleventh embodiments will be omitted in order to avoid redundancy.

Figure 36:
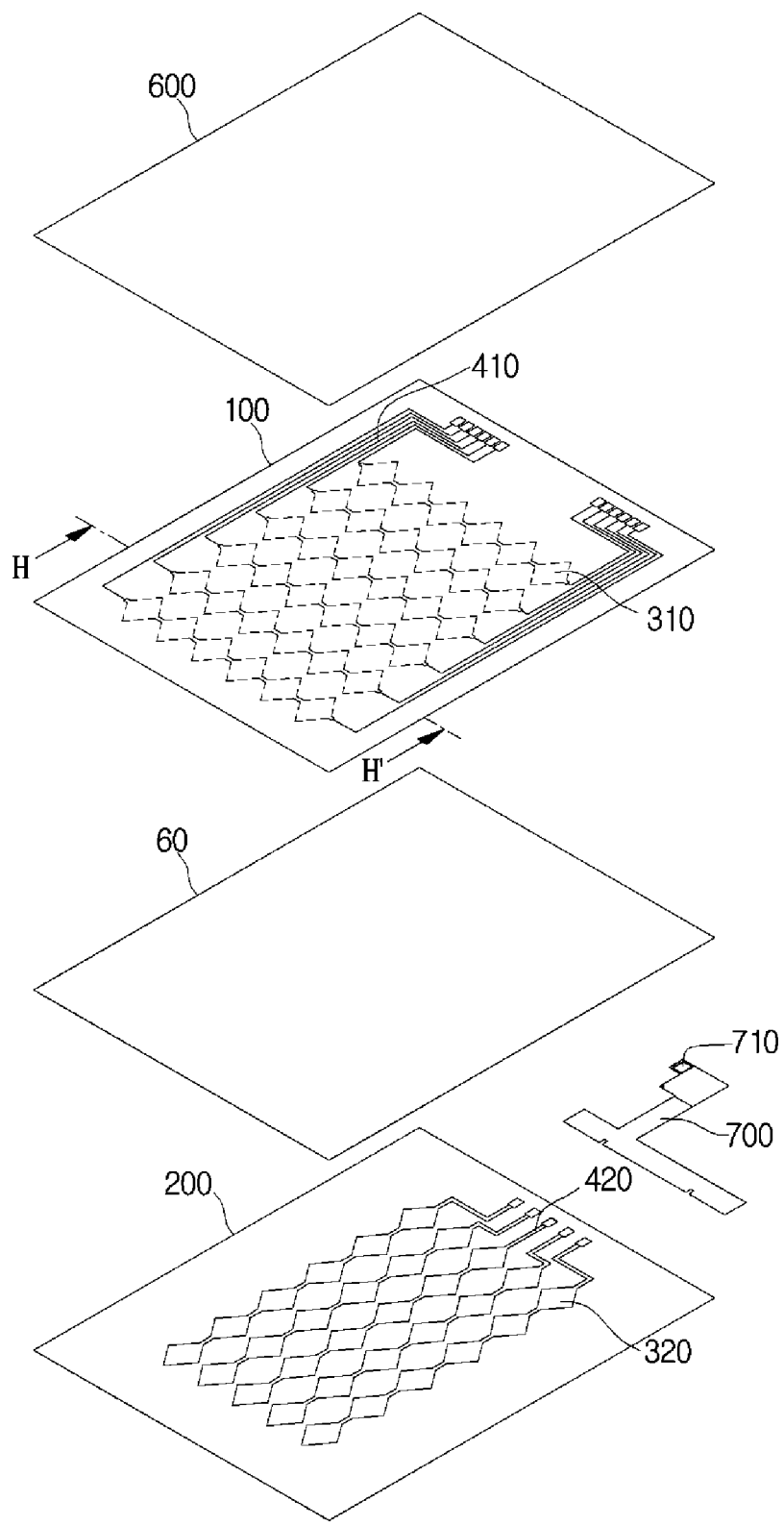
FIG. 36 is an exploded perspective view showing a touch window according to the 12-th embodiment.
Figure 37:
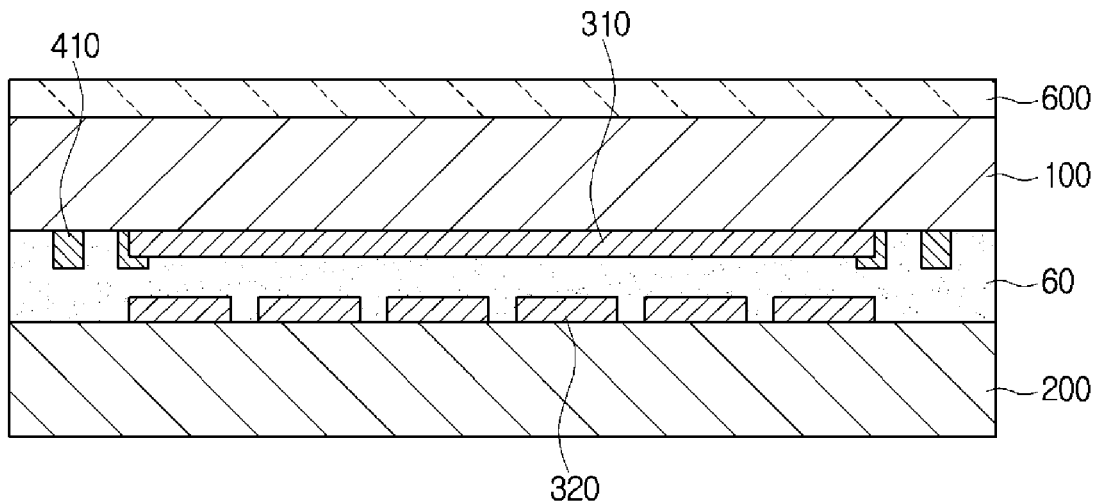
FIG. 37 is a sectional view taken along line H-H' of FIG. 36.

Meanwhile, referring to FIGS. 36 and 37, the first sensing electrode 310 may be formed on one surface of the cover substrate 100, and the second electrode 320 may be formed on one surface of the substrate 200 disposed on the cover substrate 100. An adhesive layer 60 may be interposed between the cover substrate 100 and the substrate 200. In this case, the blocking layer 600 may be disposed on the cover substrate 100.

Hereinafter, a touch window according to the 13-th embodiment will be described with reference to FIGS. 38 to 40. In the following description of the touch window according to the 13-th embodiment, the detailed descriptions about the parts similar or identical to those described in the touch windows of the first to 12-th embodiments will be omitted in order to avoid redundancy.

Figure 38:
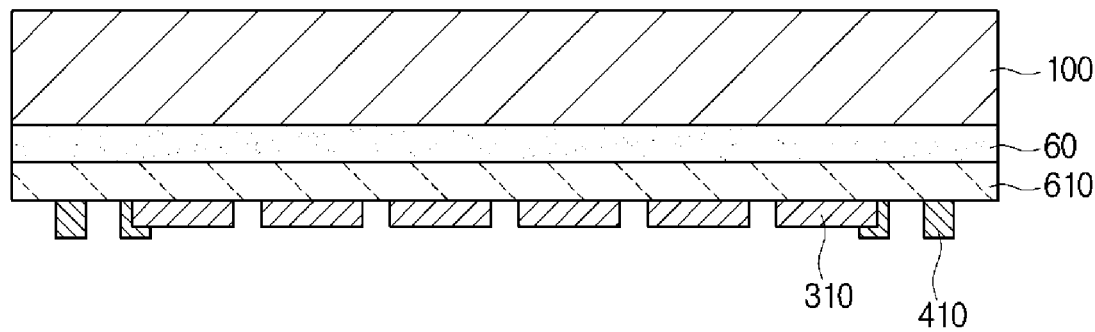
FIGS. 38 to 40 are sectional views showing a touch window according to the 13-th embodiment.

Meanwhile, referring to FIG. 38, the blocking layer 600 may serve as the electrode substrate. That is, the sensing electrode 300 and the wire 400 may be directly disposed on the blocking layer 600. The blocking layer 600 may be interposed between the touched surface of the cover substrate 100 and the sensing electrode 300. Thus, the sensing electrode 300 may be provided on a bottom surface of the blocking layer 600. That is, the cover substrate 100, the blocking layer 600 and the sensing electrode 300 may be sequentially stacked. Thus, the thickness of the touch window may be more thinly secured. Meanwhile, the optical clear adhesive 500 may be further disposed between the cover substrate 100 and the blocking layer 600.

In this case, the blocking layer 600 may include a base and a dye provided into the base. The base may include one of PET (polyethylene terephthalate), PC (polycarbonate), COC (Cyclic Olefin Copolymer) and COP (Cyclic Olefin Polymer). In addition, the dye may include one selected from the group consisting of azo dye, disperse dye and phthalocyanine dye.

The visibility may be improved through the blocking layer 600 and may be substituted for an electrode substrate, so that the thickness of the touch window may be secured to be thin.

Figure 39:
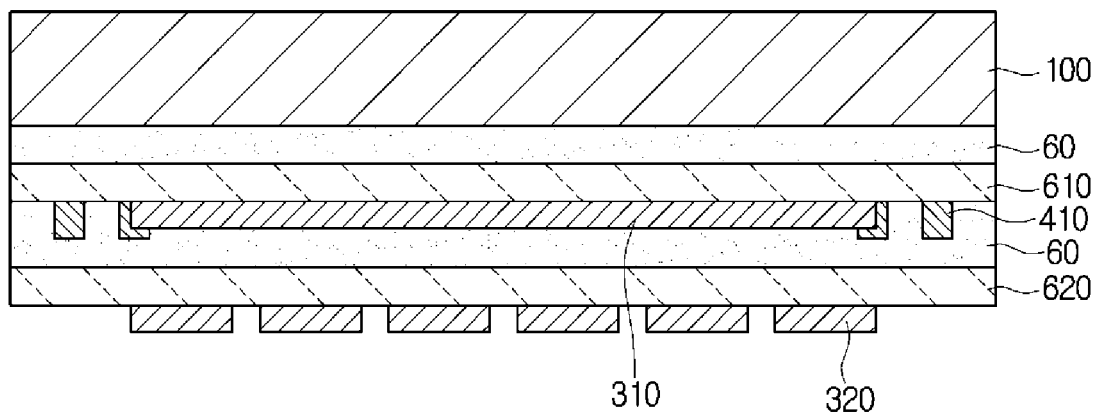

Referring to FIG. 39, the first sensing electrode 310 may be formed on the first blocking layer 610 disposed on the cover substrate 100, and the second sensing electrode 320 may be formed on the second blocking layer 620 disposed on the first blocking layer 610. The adhesive layer 60 may be interposed between the cover substrate 100 and the first blocking layers 610.

Figure 40:
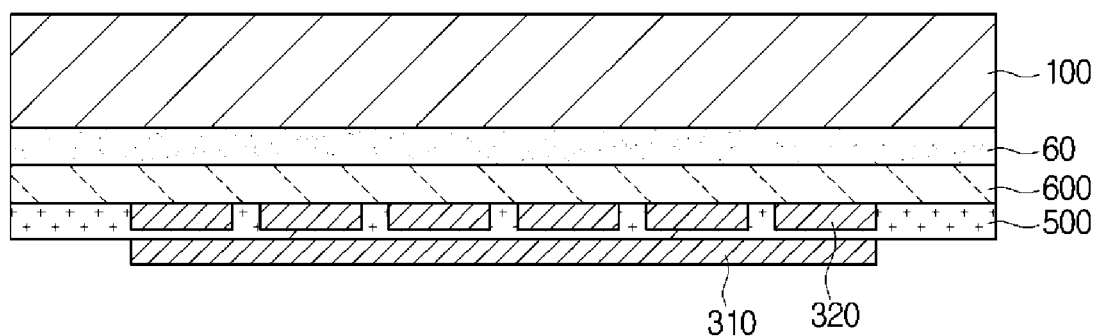

Referring to FIG. 40, the intermediate layer 500 may be disposed on the blocking layer 600. The intermediate layer 500 may be disposed on the second sensing electrode 320. The intermediate layer 500 may support the first sensing electrode 310.

FIGS. 41 to 44 are views illustrating a process of forming an electrode when the sensing electrode and/or the wire electrode have a mesh shape according to the embodiments.

Figure 41:
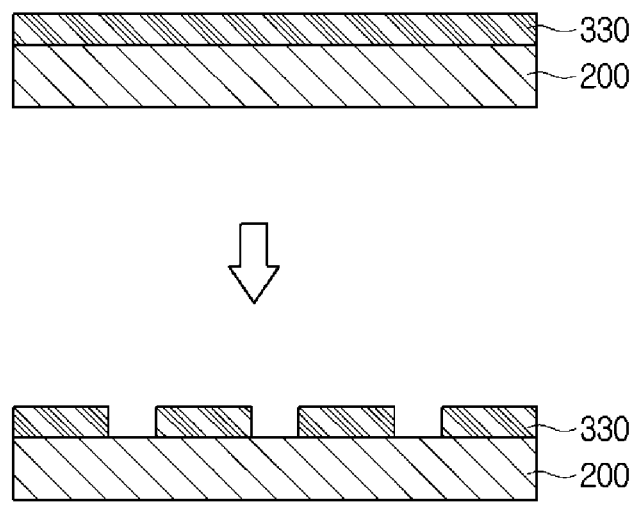
FIGS. 41 to 44 are views illustrating a process of forming a sensing electrode and/or a wire electrode according to embodiments.

Referring to FIG. 41, the sensing electrode and/or the wire electrode according to an embodiment may be formed in a mesh shape by etching a metallic layer disposed on an entire surface of the substrate 200. For example, a Cu mesh electrode having an embossed mesh shape may be formed by etching a Cu layer after metal such as Cu is deposited on the entire surface of the substrate 200 including polyethyleneterephthalate.

Figure 42:
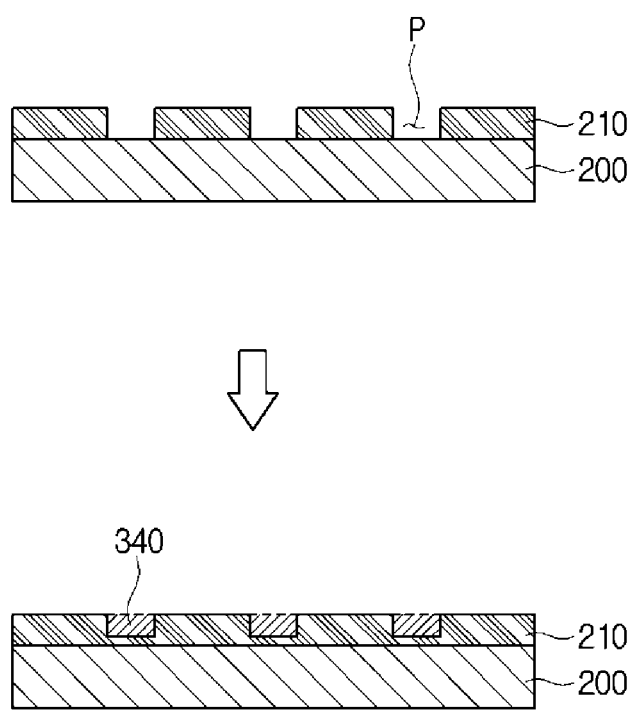

In addition, referring to FIG. 42, for the sensing electrode and/or the wire electrode according to the embodiment, after forming a resin layer 210 including photo-curing resin (UV resin) or thermosetting resin on the substrate 200 and forming an intaglio pattern P having the mesh shape on the resin layer 210, metallic paste 220 is filled in the intaglio pattern P or plating is performed on the intaglio pattern P, so that the metallic layer may be formed. In this case, the intaglio pattern of the resin layer may be formed by performing an imprinting process using a mold having an embossed pattern.

The metallic paste 220 may include a metallic paste including at least one of Cr, Ni, Cu, Al, Ag, Mo, and the alloy thereof. Accordingly, the metallic paste is filled in the mesh-shaped intaglio pattern P and cured to form an intaglio metallic mesh electrode having the mesh shape.

Figure 43:
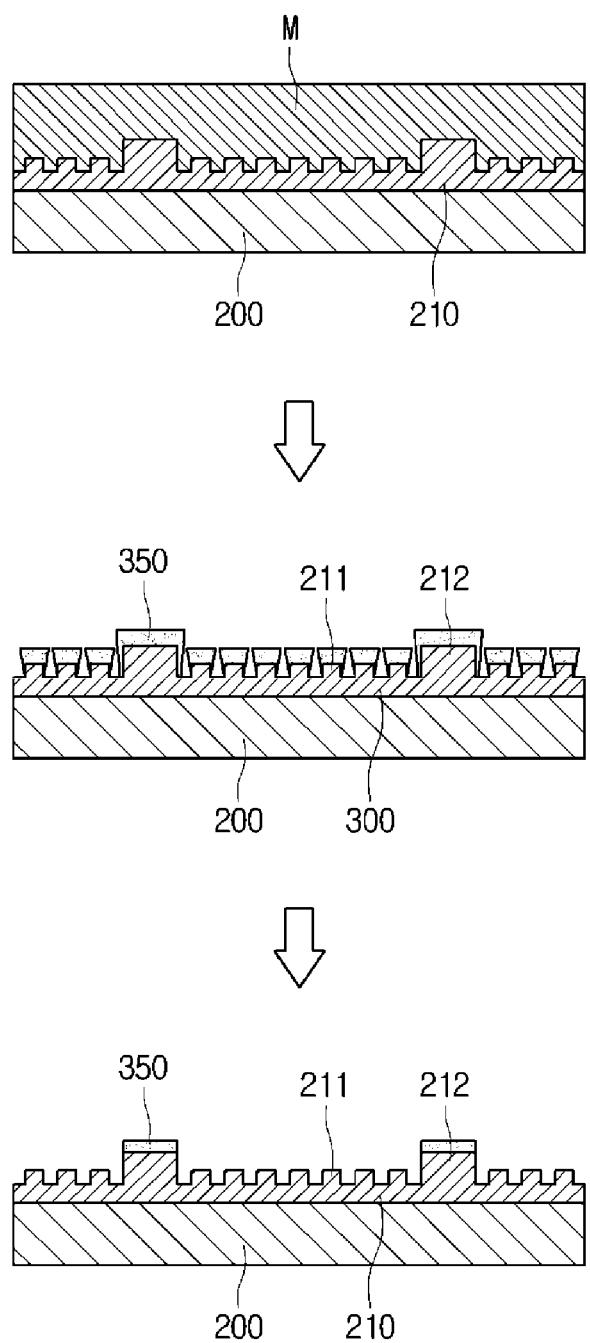

In addition, referring to FIG. 43, in the sensing electrode and/or the wire electrode according to an embodiment, after forming a resin layer including photo-curing resin (UV resin) or thermosetting resin on the substrate 200, a nano-pattern and a micro-pattern having an embossed or intaglio mesh shape are formed on the resin layer 210. Then, at least one of Cr, Ni, Cu, Al, Ag, Mo and the alloy thereof may be sputtered on the resin layer.

The nano-pattern and the micro-pattern having the embossed shape may be formed using the mold having an intaglio pattern. The intaglio pattern may be formed through the imprinting process using the mold having an embossed pattern.

Thereafter, by etching the metallic layer formed on the nano-pattern and the micro-pattern, only the metallic layer is removed from the nano-pattern, and only the metallic layer formed on the micro-pattern remains, so that the metallic electrode having the mesh shape may be formed.

In this case, when the metallic layer is etched, the difference in the etching rate between the nano-pattern and the micro-pattern may be made depending on the difference between the contact areas of the metallic layer with the nano-pattern and the micro-pattern. That is, since the contact area of the metallic layer with the micro-pattern is wider than the contact area of the metallic layer with the nano-pattern, the electrode material 215 formed on the micro-pattern is less etched. In addition, as the etching is performed at the same etching rate, the metallic layer formed on the micro-pattern remains, and the metallic layer formed on the nano-pattern 320 is etched and removed. Accordingly, the metallic electrode having the micro-pattern and the embossed mesh shape may be formed on the substrate 200.

Figure 44:
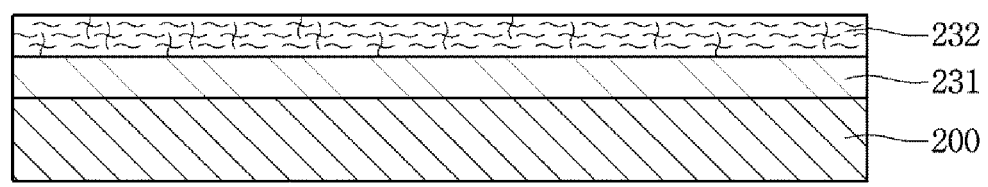

In addition, referring to FIG. 44, the sensing electrode and/or the wire electrode may be formed by disposing a base substrate on the substrate 200 and disposing a wire 232 in the base substrate 231. For example, the base substrate may include a photosensitive material and the wire may include a silver nanowire. The wire 232 may be disposed in only an upper or lower portion of the base substrate, or entirely and uniformly in the base substrate.

The sensing electrode and/or the wire electrode of a touch window according to an embodiment may include a metallic layer and be formed in a mesh shape as shown in FIGS. 41 to 44 described above.

The touch window according to the embodiment described above may further include a driving part disposed on the touch window and may be applied to a touch device. That is, the touch window according to the embodiment may include a curved or flexible touch window and may be coupled to the driving part including a display panel to be applied to a touch device.

Specifically, the touch window may include a curved touch window. That is, the touch window may be fixed while having a curvature. Specifically, when the touch window is applied to a vehicle, the curved touch window may be applied. Thus, a touch device including the curved touch window may be a curved touch device.

The display panel has a display region to output an image. The display panel applied to the display may generally include upper and lower substrates. The lower substrate may include data lines, gate lines, and thin film transistors (TFT). The upper substrate is bonded to the lower substrate to protect components provided on the lower substrate.

The display panels may be provided in various types depending on the type of the display according to the embodiment. In other words, the display according to the embodiment may include a liquid crystal display (LCD), a field emission display, a plasma display (PDP), an organic light emitting diode (OLED), and an electrophorectic display (EPD). Accordingly, the display panel may be configured in various types.

Hereinafter, one example of the display device to which the touch window according to the above-described embodiments is applied will be described with reference to FIGS. 45 to 48.

Figure 45:
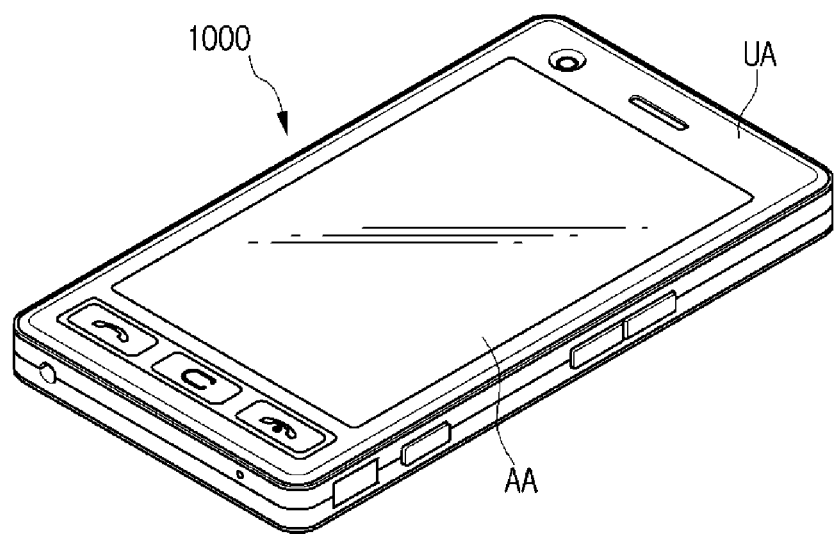
FIGS. 45 to 48 are views showing examples of touch devices to which the touch windows according to the embodiments are applied.

Referring to FIG. 45, a mobile terminal 1000 is shown as one example of the touch device. The mobile terminal may include an active area AA and an unactive area UA. The active area AA may sense a touch signal through the touch by a finger, and a command icon pattern part and a logo may be formed in the unactive area UA.

Figure 46:
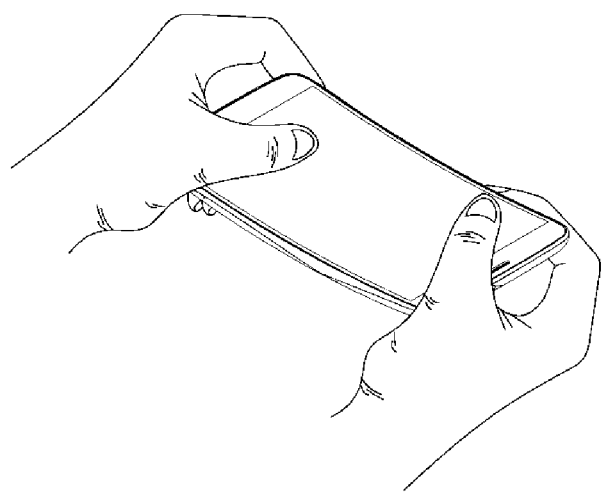

Referring to FIG. 46, the touch window may include a flexible touch window that is bendable. Accordingly, the touch device including the touch window may be a flexible touch device. Accordingly, a user can curve or bend the flexible touch window with a hand.

The embodiment provides a flexible touch window having improved reliability and visibility.

According to an embodiment, there is provided a touch window which includes: a cover substrate; a substrate on the cover substrate; and an electrode on the substrate, wherein the substrate includes one surface facing the cover substrate and an opposite surface opposite to the one surface, the electrode is disposed on the opposite surface, and the cover substrate and the substrate have flexible curved surfaces.

According to a touch window of an embodiment, an electrode disposed on a substrate or an intermediate layer may be disposed on an opposite surface of the substrate, that is, an opposite surface opposite to the cover substrate.

Thus, an electrode applied to a curved touch window or a flexible touch window may be prevented from being cracked. Therefore, the bending property and reliability of the touch window may be improved.

In addition, the touch window having a thin thickness may be secured through the intermediate layer, so that the transmittance may be improved. That is, the thickness may be less than that of the structure having two substrates according to the related art. Specifically, since the intermediate layer substitutes for one substrate and adhesive, the touch window having a thin thickness may be secured.

In addition, in the structure in which two substrates are stacked according to the related art, optically clear adhesive (OCA) is further required between the substrates. However, according to the touch window of an embodiment, a single substrate is used and an electrode is directly formed on the intermediate layer, so that the OCA may be omitted, thereby reducing the cost.

Thus, according to the touch window of an embodiment, at least parts of the first and second wires are formed to overlap each other. The ground wire is disposed between the first and second wires, so that parasitic capacitance may be prevented from being generated. Further, even though the first and second wires are formed on mutually different layers, a tolerance for preventing the parasitic capacitance from being generated may be omitted. For this reason, the touch window according to an embodiment may be formed to have a narrow bezel. For this reason, the touch window according to an embodiment may be applied to various designs.

In addition, the touch window according to an embodiment includes a blocking layer. The blocking layer may block the incident light having a short wavelength, so that the visibility of the electrode may be improved. Specifically, when the electrode includes an interconnecting structure such as a nanowire, the electrode has reflectance of about 30% to about 80% in the wavelength band of 300 nm to 800 nm, so that the interconnecting structure allows the visibility to deteriorate. In detail, the interconnecting structure may have reflectance of about 35% to about 75% in the wavelength band of 350 nm to 780 nm. In more detail, the interconnecting structure may have reflectance of about 37% to about 70% in the wavelength band of 380 nm to 700 nm. Thus, the light having a wavelength of 300 nm to 800 nm is blocked through the blocking layer, so that the reflectance may be reduced.

In addition, even when the electrode includes a metal weak in light reflection, the light reflectance may be reduced through the blocking layer.

Meanwhile, according to the touch window of another embodiment, the blocking layer substitutes for an electrode substrate, so that the visibility may be improved and the thickness of the touch window may be secured to be thin.

Figure 47:
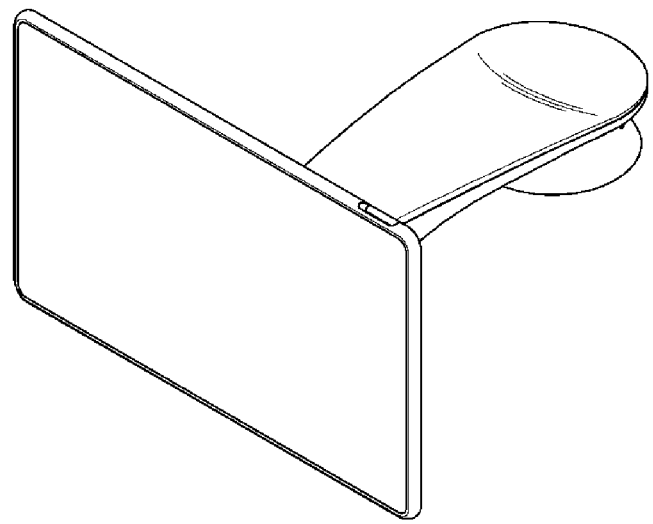
Figure 48:
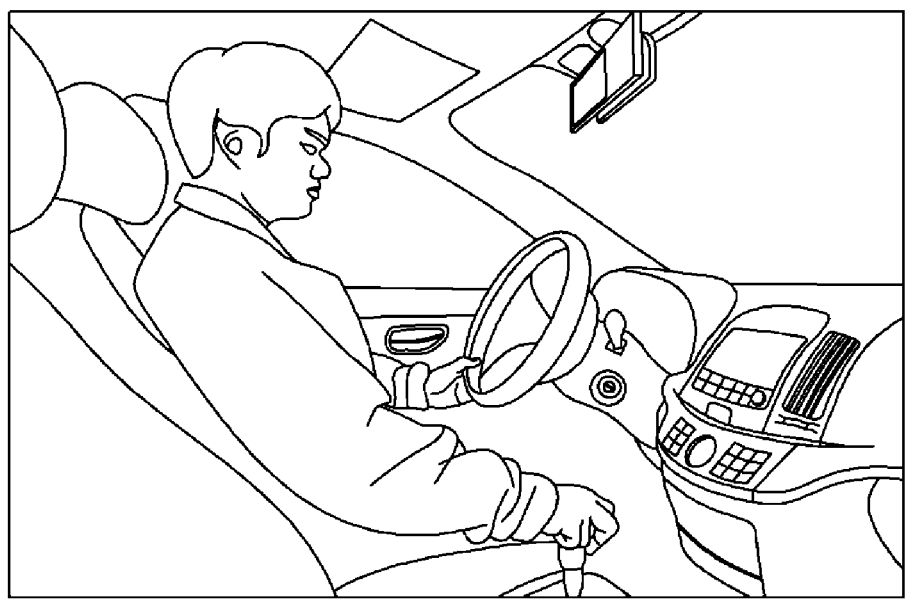

Referring to FIG. 47, the touch window may be applied to a vehicle navigation system as well as the touch device of a mobile terminal. In addition, referring to FIG. 47, the touch window may be applied to an inner part of a vehicle. In other words, the touch window may be applied to various parts in the vehicle. Accordingly, the touch window may be applied to a dashboard as well as a PND (Personal Navigation Display), so that a CID (Center Information Display) may be realized. However, the embodiment is not limited to the above, and the touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a substrate;
   and
   an electrode provided on the substrate,
   a cover substrate provided on the substrate, wherein the cover substrate includes a partial flat surface and a partial curved surface at an outermost edge of the cover substrate,
   an adhesive layer proved between the cover substrate and the substrate,
   wherein the electrode includes;
      a first sensing electrode extending in a first direction and having a plurality of first electrode parts and a plurality of first connection parts, and
      a second sensing electrode extending in a second direction that is different from the first and having a plurality of second electrode parts and a plurality of second connection parts,
      wherein the first electrode parts and the second electrode parts are disposed on a same plane, and
      wherein an area of an insulating layer between the first connection parts and the second connection parts is larger than an area of the electrode; and
   a wire electrode including a first wire electrode connected to the first electrode parts, and a second wire electrode connected to the second electrode parts, wherein the second wire electrode and the second electrode parts are disposed on different planes by the insulating layer,
   wherein the electrode and the wire electrode include at least one of chromium (Cr), nickel (Ni), copper (Cu), aluminum (Al), silver (Ag), or molybdenum (Mo),
   wherein the electrode has a mesh shape including a mesh line and a mesh opening,
   wherein a line width of the first electrode parts, the first connection parts, the second electrode parts and the second connection parts is 1.5 μm to 3 μm, and
   wherein an area of the partial flat surface is greater than an area of the partial curved surface.

2. The touch window of claim 1, further comprising an intermediate layer having an insulating material and provided between the cover substrate and the substrate, wherein the intermediate layer includes a first surface facing the cover substrate and a second surface opposite to the first surface,
   wherein one of the first electrode or the second electrode is disposed on the first surface of the intermediate layer.

3. The touch window of claim 2, wherein the cover substrate, the intermediate layer and the substrate are bent in a direction of the second surface.

4. The touch window of claim 1, further comprising a blocking layer disposed between the cover substrate and the substrate.

5. The touch window of claim 4, wherein the blocking layer blocks light having a wavelength of 300 nm to 800 nm.

6. The touch window of claim 4, wherein the blocking layer includes a base and a dye provided in the base.

7. The touch window of claim 6, wherein the base includes at least one of polyethylene terephthalate (PET), polycarbonate (PC), cyclic olefin copolymer (COC) or cyclic olefin polymer (COP), and
wherein the dye includes at least one of azo dye, disperse dye or phthalocyanine dye.

8. The touch window of claim 1, wherein the partial curved surface of the cover substrate is provided in two sides of the outermost edge of the cover substrate.

9. The touch window of claim 1, wherein the substrate comprises a partial flat surface and a partial curved surface, and wherein the partial curved surface of the substrate is provided in two sides of an outermost edge of the substrate.

10. The touch window of claim 2, wherein the intermediate layer includes a partial flat surface and a partial curved surface, and wherein the partial curved surface of the intermediate layer is provided in two sides of an outermost edge of the intermediate layer.

11. The touch window of claim 2, wherein the intermediate layer and the substrate have a same shape.

12. The touch window of claim 1, wherein the cover substrate is thicker than the substrate.

13. The touch window of claim 2, wherein the cover substrate is thicker than the intermediate layer.

14. A touch device comprising:
a display panel; and
a touch window on the display panel;
wherein the display panel is an organic electroluminescence light emitting device,
wherein the display panel includes a first substrate,
wherein a thin film transistor and an organic light-emitting device are formed on the first substrate,
wherein the touch window includes:
a substrate;
a cover substrate on the substrate, wherein the cover substrate includes a partial flat surface and a partial curved surface at an outermost edge of the cover substrate,
an adhesive layer between the cover substrate and the substrate,
an electrode on the substrate, the electrode including:
a first sensing electrode extending in a first direction and having a plurality of first electrode parts and a plurality of first connection parts; and
a second sensing electrode extending a second direction that is different from the first direction and having a plurality of second electrode parts and a plurality of second connection parts,
wherein the first electrode parts and the second electrode parts are disposed on a same plane, and
wherein an area of an insulating layer between the first connection parts and the second connection parts is larger than an area of the electrode; and
a wire electrode including a first wire electrode connected to the first electrode parts, and a second wire electrode connected to the second electrode parts, wherein the second wire electrode and the second electrode parts are disposed on different planes by the insulating layer,
wherein the electrode and the wire electrode include at least one of chromium (Cr), nickel (Ni), copper (Cu), aluminum (Al), silver (Ag), or molybdenum (Mo),
wherein the electrode has a mesh shape including a mesh line and a mesh opening,
wherein a line width of the first electrode parts, the first connection parts, the second electrode parts, and the second connection parts is 1.5 μm to 3 μm, and
wherein an area of the partial flat surface is greater than an area of the partial curved surface.

15. The touch device of claim 14, wherein the partial curved surface of the substrate is provided in two sides of an outermost edge of the substrate.

16. The touch device of claim 14, wherein the cover substrate is thicker than the substrate.

17. The touch device of claim 14, further comprising an intermediate layer provided between the cover substrate and the substrate, wherein the intermediate layer includes an insulating material, and wherein the cover substrate is thicker than the intermediate layer.

18. The touch window of claim 1, wherein the insulating layer has a thickness that is less than a thickness of the substrate.

19. A touch device comprising;
a display panel; and
a touch window on the display panel;
wherein the display panel is an organic electroluminescence light emitting device,
wherein the display panel includes a first substrate and a second substrate,
wherein a thin film transistor and an organic light-emitting device are formed on the first substrate,
wherein the touch window includes:
a cover substrate;
an electrode on the second substrate,
wherein the electrode includes a first electrode and a second electrode,
wherein the second substrate includes a first surface facing the cover substrate and a second surface opposite with the first surface of the second substrate,
wherein at least one of the first electrode or the second electrode is provided between cover substrate and the first surface of the second substrate,
wherein the cover substrate includes a partial flat surface and a partial curved surface at an outermost edge of the cover substrate,
wherein the first electrode includes a first sensing electrode extending in a first direction on the second substrate, and a first wire electrode electrically connected to the first sensing electrode,
wherein the second electrode includes a second sensing electrode extending in a second direction different from the first direction on the second substrate, and a second wire electrode electrically connected to the second sensing electrode,
wherein the first sensing electrode and second sensing electrode have a mesh shape,
wherein the first sensing electrode includes first electrode parts and first connection parts,
wherein the second sensing electrode includes second electrode parts and second connection parts,
wherein an insulation layer is provided between the first connection parts and the second connection parts, and
wherein the first electrode parts, the second electrode parts, the first connection parts, and the second connection parts include a plurality of mesh lines and a mesh opening part.

* * * * *